(12) United States Patent  (10) Patent No.: US 9,197,764 B2
Vantieghem  (45) Date of Patent: Nov. 24, 2015

(54) AUDIO/VISUAL MEDIA STORAGE AND PLAYBACK DEVICES AND COMPONENTS THEREFOR

(71) Applicant: Dinotalk, Inc., Alpharetta, GA (US)

(72) Inventor: Bart Gentiel Vantieghem, Alpharetta, GA (US)

(73) Assignee: Dinotalk, Inc., Alpharetta, GA (US)

( * ) Notice: Subject to any disclaimer, the term of this patent is extended or adjusted under 35 U.S.C. 154(b) by 0 days.

(21) Appl. No.: 14/463,252

(22) Filed: Aug. 19, 2014

(65) Prior Publication Data

US 2014/0355949 A1 Dec. 4, 2014

Related U.S. Application Data

(63) Continuation of application No. 13/024,305, filed on Feb. 9, 2011, now abandoned, which is a continuation-in-part of application No. 12/841,808, filed on Jul. 22, 2010, now abandoned, which is a continuation-in-part of application No. 12/145,752, filed on Jun. 25, 2008, now abandoned.

(60) Provisional application No. 61/227,531, filed on Jul. 22, 2009, provisional application No. 61/302,942, filed on Feb. 9, 2010.

(51) Int. Cl.
| | |
|---|---|
| *G10L 21/00* | (2013.01) |
| *H04N 1/00* | (2006.01) |
| *G11B 20/10* | (2006.01) |
| *G11B 31/00* | (2006.01) |
| *H04N 1/21* | (2006.01) |
| *H04N 5/765* | (2006.01) |
| *H04N 5/77* | (2006.01) |

(52) U.S. Cl.
CPC ............ *H04N 1/00196* (2013.01); *G11B 20/10* (2013.01); *G11B 31/006* (2013.01); *H04N 1/212* (2013.01); *H04N 5/765* (2013.01); *H04N 5/772* (2013.01); *G09G 2380/16* (2013.01); *G11B 2020/10537* (2013.01)

(58) Field of Classification Search
CPC .............. H04N 2201/0089; H04N 2201/0087; H04N 2201/3274; H04N 1/00127; H04N 21/8153; H04N 5/2252; H04N 5/772; B41J 29/13; G06F 1/1626; G06F 2200/1633
USPC ................. 704/270, 272, 276, 278, 273, 275; 386/224, 230; 715/500
See application file for complete search history.

(56) References Cited

U.S. PATENT DOCUMENTS

| | | | |
|---|---|---|---|
| 2005/0060636 A1* | 3/2005 | Mathe | 715/500 |
| 2007/0294185 A1* | 12/2007 | Sullivan et al. | 705/70 |
| 2012/0321272 A1* | 12/2012 | Sikorski | 386/224 |

* cited by examiner

*Primary Examiner* — Huyen Vo
(74) *Attorney, Agent, or Firm* — Stites & Harbison, PLLC; David W. Nagle, Jr.

(57) ABSTRACT

Systems, methods, technologies, and devices for use as standalone products or products that interface with personal computers, MP3, or MPEG players are disclosed. Various devices and electronics for recording or loading of electronic information, in particular electronic media, such as audio and visual media or multimedia, on a variety of novelty products or devices are disclosed. In some embodiments, a person can record directly to a memory module in the novelty product. In other embodiments, a person can upload multimedia data onto the novelty product via a data port, for storage and later playback on the novelty product. In some embodiments, a person can do both.

4 Claims, 28 Drawing Sheets

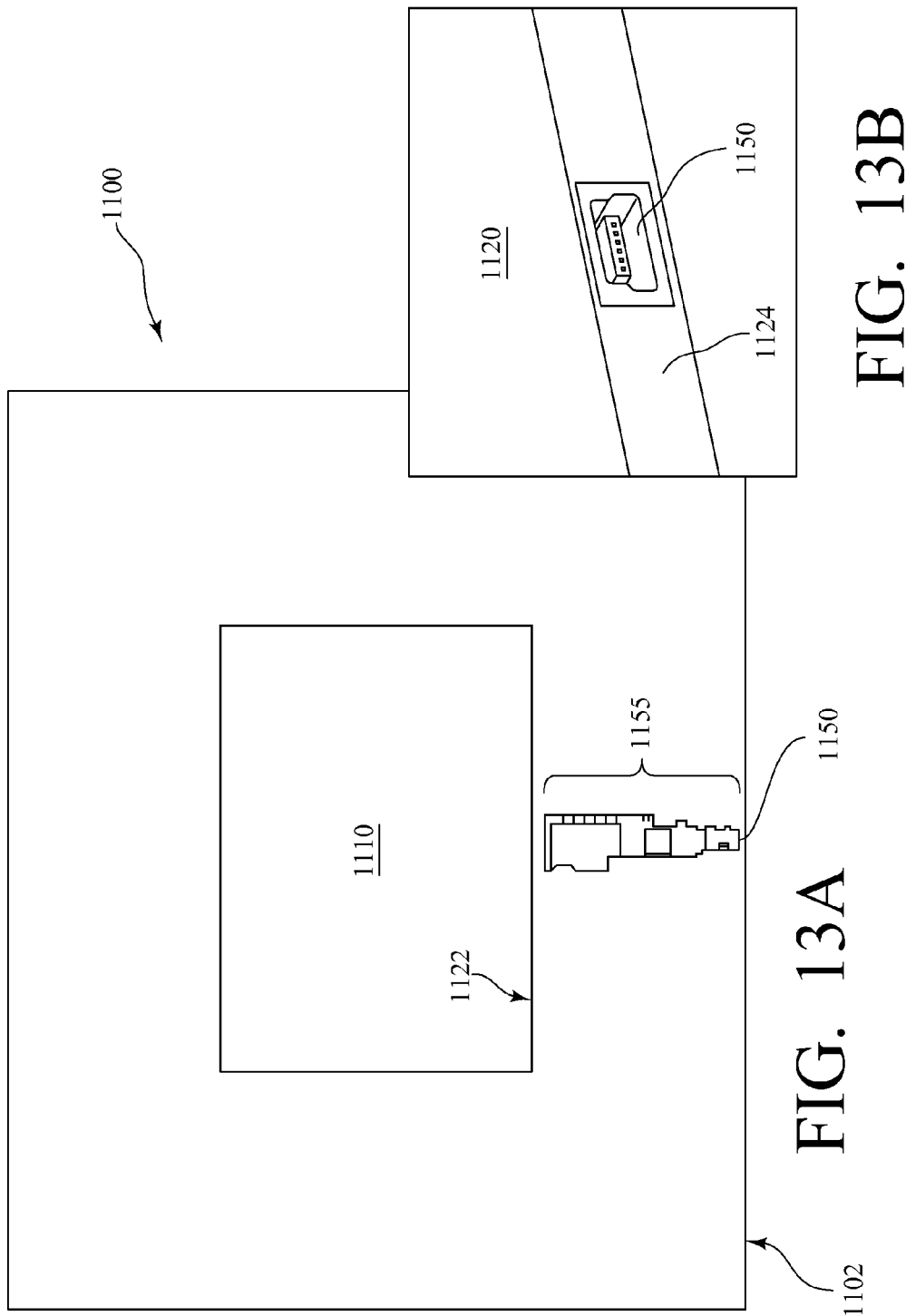

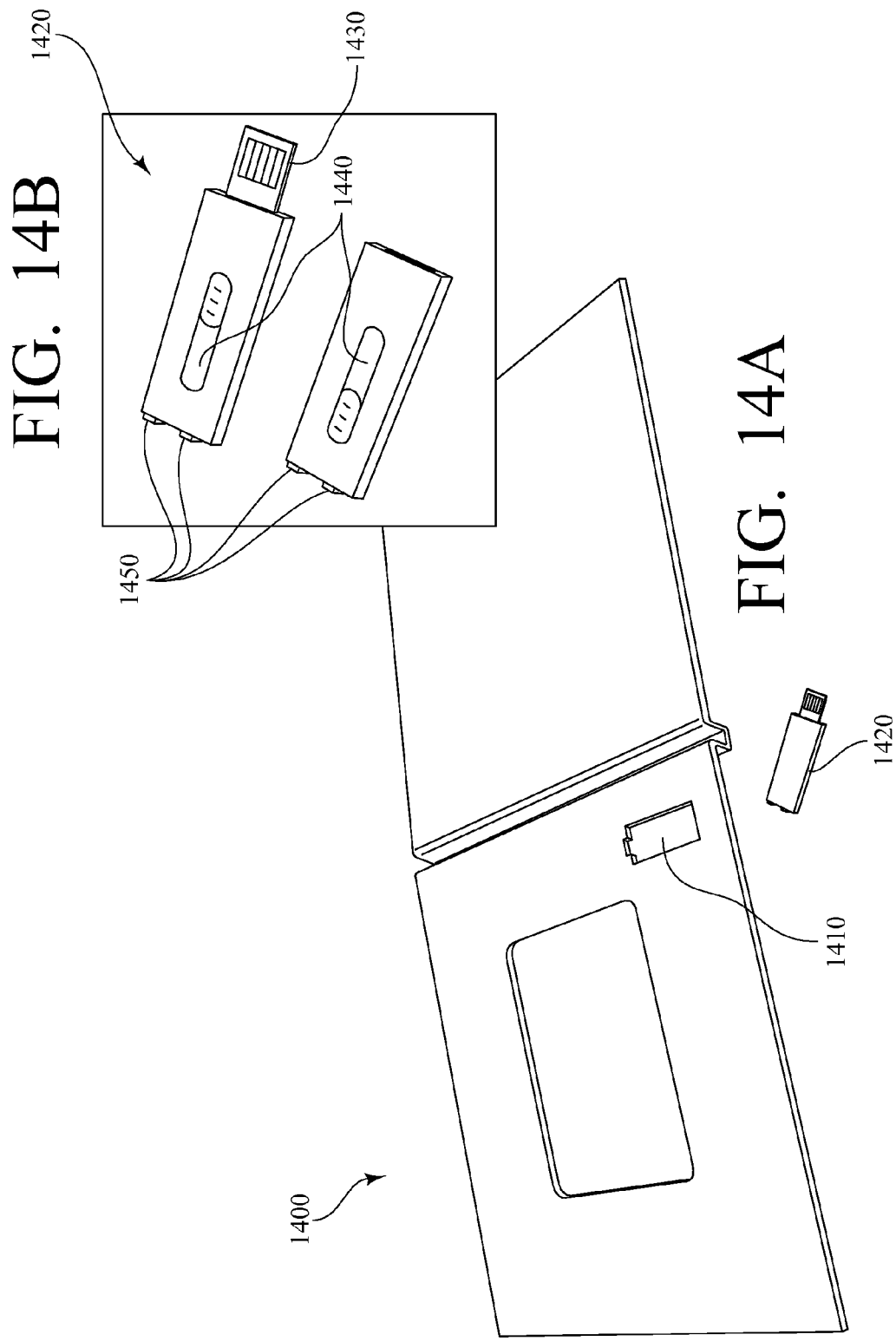

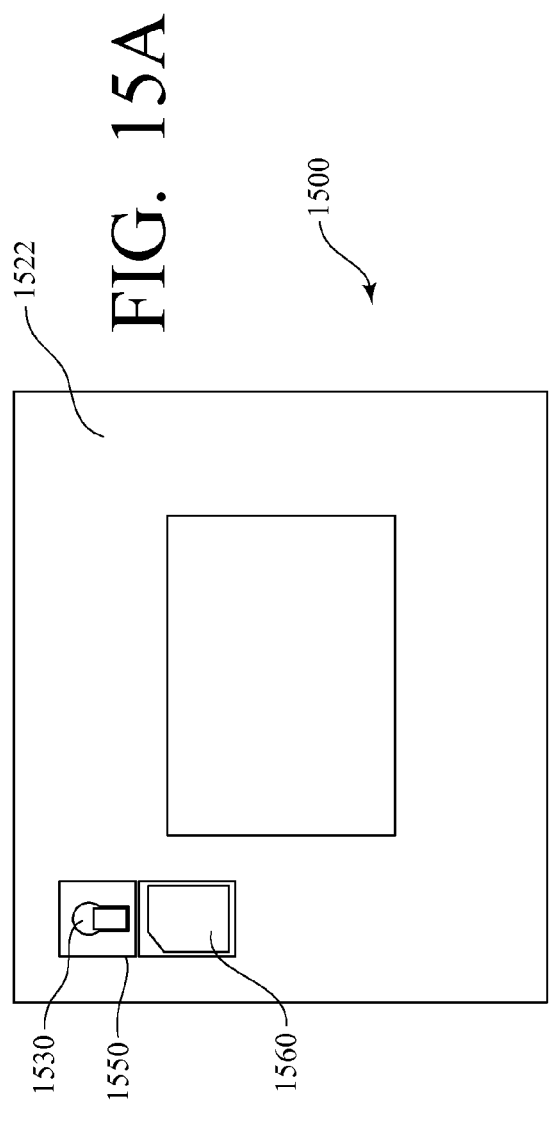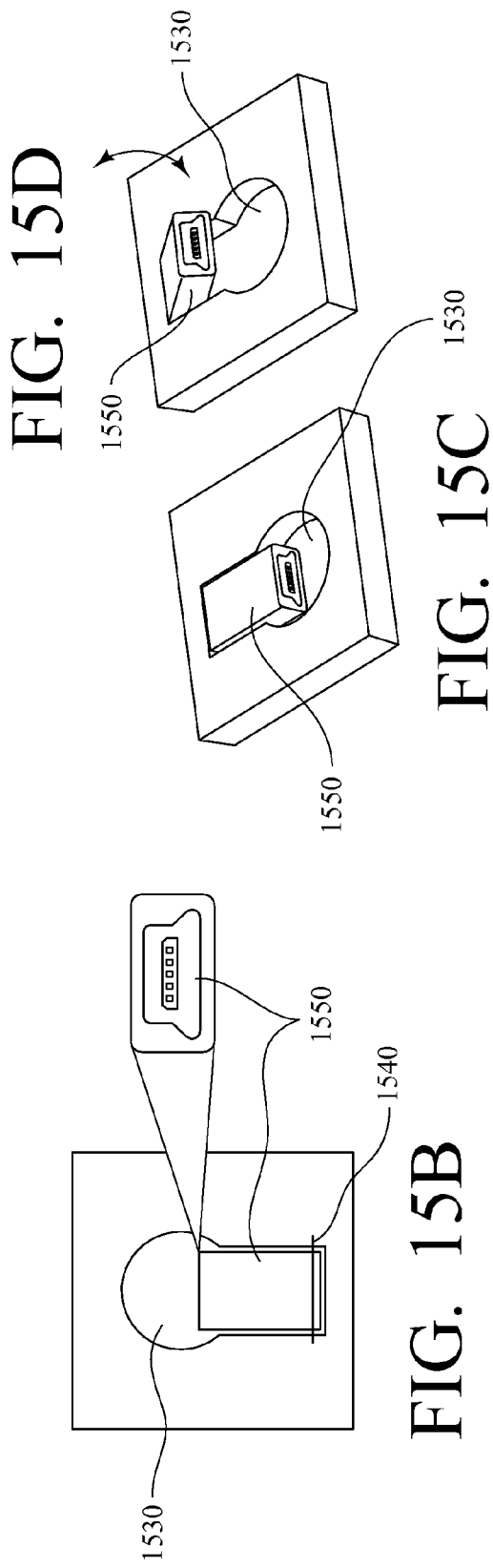

FIG. 23

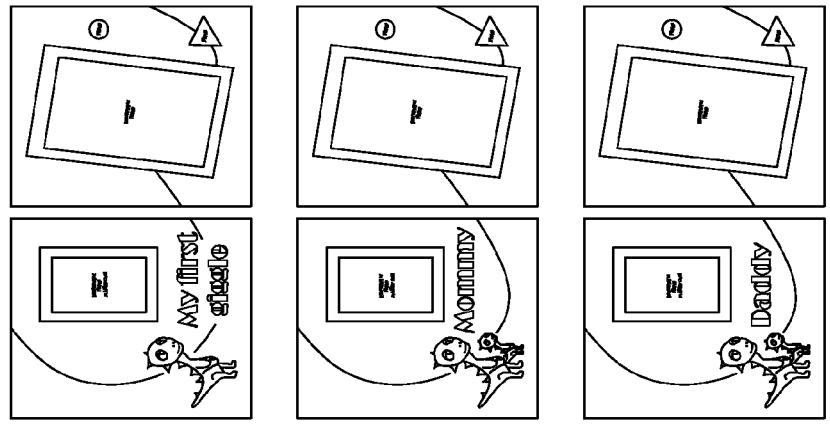
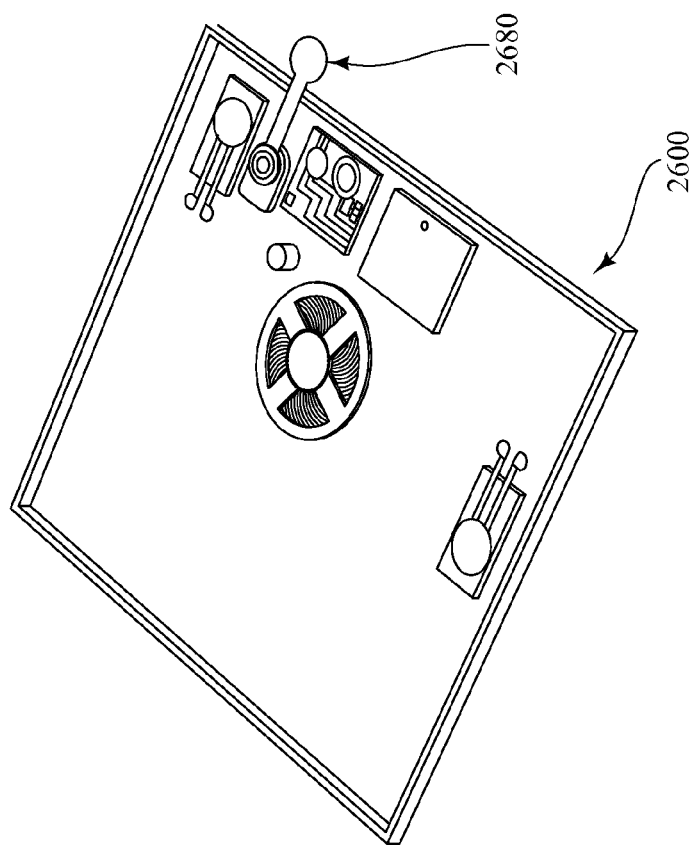
FIG. 26

AUDIO/VISUAL MEDIA STORAGE AND PLAYBACK DEVICES AND COMPONENTS THEREFOR

CROSS REFERENCES TO RELATED APPLICATIONS

This application is a continuation of U.S. patent application Ser. No. 13/024,305 filed on Feb. 9, 2011, which is a continuation-in-part of U.S. patent application Ser. No. 12/145,752, filed on Jun. 25, 2008, and of U.S. patent application Ser. No. 12/841,808, filed on Jul. 22, 2010, which claimed priority to U.S. Provisional Patent Application Ser. No. 61/227,531, filed on Jul. 22, 2009. This application further claims priority to U.S. Provisional Patent Application Ser. No. 61/302,942, filed on Feb. 9, 2010. The contents, teachings, and disclosures of all of the above are hereby incorporated by reference in their entirety.

FIELD OF THE INVENTIONS

The present systems, methods, and devices described herein relate generally to novelty, keepsake, and/or promotional items, such as photo albums, gift cards, gift card holders, envelopes, greeting cards, books, journals, ornaments, jewelry boxes, picture frames, product containers, and the like and more particularly to such novelty, keepsake, and/or promotional items that are able to be customized easily, quickly, and cheaply by a user or purchaser of such items by incorporating personalized or promotional audio, video, electronic photographs, and/or similar multimedia data onto a data storage medium contained within such item, for later playback or viewing.

BACKGROUND

Electronic components and circuits continue to benefit from increases in technology that have resulted in decreased cost of manufacturing and continued miniturization of such components, which is making it easier and more inexpensive to incorporate simple electronic circuits and applications even in products that are generally considered disposable.

Recordable and Playback Function for Foldable Products.

Currently, as an example, it is not uncommon to find greeting cards including a small electronic device for playing audio, the device activated by opening the card. The components of the device are generally secured on one side of the card, and an actuator portion is secured across a fold from the one side to a second side. The actuator portion has a fold formed therein so that, when the card is closed, the portion on the one side moves to an "off" position, yet opening of the card straightens the actuator portion and pulls the same to an "on" position; thus, activating the device to play the pre-recorded or newly recorded audio. In other embodiments, a button may be depressed or actuated in order to activate playback and/or recording, if capable of such. This function enables people to add a voice or sound memory to any product.

Many greeting cards are clearly not personal to the recipient. For instance, the commercial airline company Southwest Airlines provides customers enrolled in the company's frequent flier program with a greeting card on their birthday. As another example, State Farm Insurance has traditionally done the same. However, without anything more than a clearly pre-printed message and no real signature, the impact of such an impersonal card is diminished.

Greeting cards from friends and relatives typically convey a greater sense of personalization, as well as a greater sense of fun and enjoyment. Accordingly, cards that include the above described audio-playback circuit are found desirable. The giver of such greeting cards will also spend more time and effort in selecting a card that is appropriate to the relationship between the giver and the recipient, considering a number of features including the pre-printed message, the artwork or theme, which may be humorous or emotionally touching, as examples, as well as the actual message for any card including the above-described audio playback.

U.S. Pat. No. 5,761,836, to Dawson, discloses a "card" as a "presentation vehicle" for a gift or article. A slot is provided in the card for receiving the article so that insertion of the article opens a circuit, and removal of the article closes the circuit to activate audio playback of a message. The card also operates as described above so that folding two portions also opens the circuit to de-activate the playback.

U.S. Pat. Nos. 5,387,108, and 5,577,918 are related patents to Crowell that disclose a variety of designs that enable a user to record a personalized audio message and play the same when activated. In the disclosed designs, however, it is considered an important feature that the device allow recording and re-recording of the audio message. It is often impossible to make the recording more permanent for keepsake purposes.

One drawback to the above-type of greeting cards is the fact that the record and/or playback function is either built into the product or it is not. Thus, there has been a need in the industry for an add-on apparatus to a conventional greeting card or other folding item or product, such as a book, journal, box cover, or the like, that allows a purchaser of the product to add an audio recording and playback system, after-the-fact, to such pre-existing products.

USB Connection and Storage Functionality.

In addition to the above, USB storage devices are now well known in the art, are well established, and becoming more readily available in a multitude of storage capacities, colors, shapes, and sizes, and at increasing diminishing costs. USB storage devices can be used simply to store data, and act like a "mini" hard drive. Or, increasingly, they are being paired with multimedia devices, such as MP3 and/or MPEG players, to enable audio storage and playback of audio, still images, and video content. USB devices themselves are typically just used to transfer or store information. More sophisticated and expensive MP3 and MPEG players are typically sold and used as stand-alone multimedia devices that allow users to carry multimedia content with them in a portable and retrievable fashion.

Photo Books or Picture Albums.

Traditional photobooks and picture albums have been around for many years and are, in fact, with the advent of online and digital photo storage and easy publishing and access to personal video clip on publishing websites, such as YouTube®, becoming more and more anachronistic. However, photobooks and photoalbums still offer a more personalized viewing experience and will likely remain a staple product on the living room or den shelves or coffee tables of families for many years to come, because they allow and provide a mutual viewing and bonding experience that can only be shared by people actually sitting down together and reminiscing about fun and memorable times with family and friends.

Despite the value of photobooks and picture albums, there is the risk that such products will become obsolete and seen as less desirable by future generations. For this reason, and many others, there is a need in the marketplace to marry traditional products, such as photobooks and picture albums with some newer technologies that are finally getting to the point at which they can be combined in an economical and heretofore unknown manner.

Adapting and modifying the technologies, systems, methods, and devices described above also leads to interesting and new combinations of existing, conventional products with the multimedia capabilities of the circuits and the personalized recording and playback technologies described herein.

Additionally, there has been and continues to be a need for an improved apparatus that incorporates audio and visual media into photo books and other devices, building a bridge between old and current media formats into one product and into a product that can be easily customized and personalized by the user or purchaser of the product.

Yet further, gift cards are another type of product that can benefit from the combinations of technologies and techniques described herein. Often, a gift card is the gift of choice (and laziness) in today's busy and impersonal world. In a prior application, Applicant described and disclosed a "Talking Envelope" that offered a recordable gift card holder, that enabled a gift card purchaser to personalize the gift card by recording a personalized message that could be stored in or on the envelop of the gift card for later playback by the recipient of the gift card.

In another prior application, Applicant disclosed the use of the "Talking Paper" concept, which enabled similar personalized recording and playback devices to be added to any product or container, such as a conventional book, an ornament, a product box, including a pizza deliver box or an express mail envelop or box, and many other similar items in which it may desirable for the sender or seller of the product to include a personalized or pre-recorded message, at low cost and expense, to the product being sold.

With the addition of USB and similar data ports and the use of data storage devices that are becoming smaller, flatter, and cheaper, it is now possible to expand the original concepts of the talking envelope and talking paper to full-multimedia recording, storage, and playback and build such technology into existing products that heretofore were not deemed to be related to or combinable with such technologies, as will be described herein.

SUMMARY OF THE INVENTIONS

The present systems, methods, technologies, and devices described herein relate generally to novelty, keepsake, and/or promotional items, such as photo albums, gift cards, gift card holders, envelopes, greeting cards, books, journals, ornaments, jewelry boxes, picture frames, product containers, and the like and, more particularly, to such novelty, keepsake, and/or promotional items that are able to be customized easily, quickly, and cheaply by a user or purchaser of such items by incorporating personalized or promotional audio, video, electronic photographs, and/or similar multimedia data storage medium contained within such item, for later playback and/or viewing.

In accordance with an aspect of the present invention, a variety of unconventional media recordation and playback/display devices are disclosed, which include a port or hub for electrical or data connection with another system or device for uploading of data (text, audio, video, still images, or combinations of any of the above) onto the playback/display devices for later retrieval and playback.

The above features as well as additional features and aspects of the systems, methods, technologies, and devices disclosed herein will become apparent from the following detailed description of illustrative embodiments of the systems, methods, technologies, and devices. In addition, other systems, methods, features and advantages will be or will become apparent to one skilled in the art upon examination of the following drawings and detailed description. It is intended that all such additional systems, methods, features and advantages be included within this description and be within the scope of the present disclosure.

BRIEF DESCRIPTION OF THE DRAWINGS

The systems, methods, technologies, and devices disclosed herein are illustrated in the figures of the accompanying drawings which are meant to be exemplary and not limiting, in which like references and reference numerals are intended to refer to like or corresponding parts, and in which:

FIGS. 13A and B illustrate a top plan view and a perspective, blow up of a portion of the exemplary product of FIG. 11;

FIGS. 14A and B illustrate a second exemplary product of the second embodiment having a removable data storage device;

FIGS. 15A through 15D illustrate a third exemplary product of the second embodiment having a pivotal, non-removable data storage device;

FIGS. 21-23 illustrates various aspects and components of a gift card envelope having a data port for interfacing with a conventional computer and for uploading data therefrom; and FIGS. 24-31 illustrate additional, exemplary products adapted and configured for use with the components, circuitry, and functional capabilities of the second embodiment.

DETAILED DESCRIPTION OF PREFERRED EMBODIMENTS

Detailed embodiments of the systems, methods, technologies, and devices are disclosed hereinafter; however, it is to be understood that the disclosed embodiments are merely exemplary of the systems, methods, technologies, and devices, which may be embodied in various forms. Therefore, specific functional details disclosed herein are not to be interpreted as limiting, but merely as a basis for the claims and as a representative basis for teaching one skilled in the art to variously employ the systems, methods, technologies, and devices disclosed herein.

Generally, the systems, methods, technologies, and devices disclosed herein include and may be implemented, in part, within, with access to, or as part of a computer system having one or more databases and other storage apparatuses, servers, and additional components, such as processors, terminals and displays, computer-readable media, algorithms, modules, and other computer-related components. The computer systems are especially configured and adapted to perform the functions and processes of the systems as disclosed herein and, as will be appreciated by those skilled in the art, to interact with the devices and components of the various product, systems, and devices disclosed and described herein.

Embodiment 1

Adding Audio Recordings to Existing Products

Before turning to the uploading, storage, and playback of a wide variety of multimedia content with a wide variety of existing, conventional products (Embodiment 2 and following), we will first review and revisit the basic design and functionality for inclusion of a recordable audio playback system that can be added to any existing, conventional product (Embodiment 1). Embodiment 1 provides the background and basic components that are also used with the more sophisticated circuit design of Embodiment 2 that enables the uploading of a variety of multimedia data or content, including text, audio, photos, video, and other data files to an existing, conventional product, as will be described in greater detail hereinafter.

Figure 1:
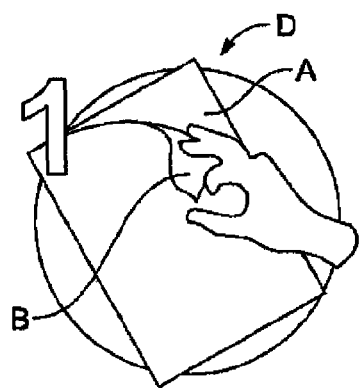
FIGS. 1-4 are illustrations of steps for utilizing a user-installed audio playback device of the present invention in a folding device.
Figure 2:
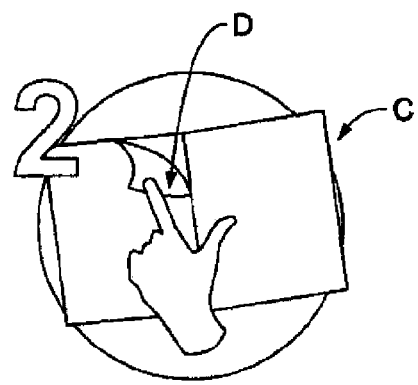

Embodiment 1 will now be described in greater detail with reference to FIGS. 1-10. Referring first to FIGS. 1-4, a user-selected folding apparatus in the form of a greeting card C is illustrated, and an audio playback device D of the present invention is illustrated. FIG. 1 shows a rear side of the audio playback device D and, specifically, illustrates a backing B that is removable to expose adhesive A on the audio playback device D. The adhesive may be pressure-sensitive adhesive, as a mere example.

Once the backing B has been removed, the adhesive A and the audio playback device D may be secured to the greeting card C. In greater detail, the audio playback device D is secured across the fold of the greeting card C (or, in other forms, a desired fold of another folding apparatus, not shown).

Figure 3:
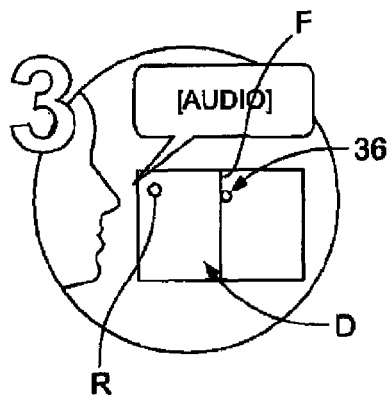
Figure 4:
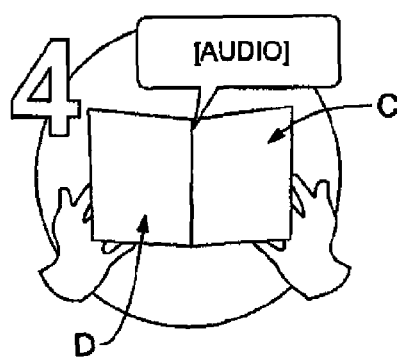

In the present form, the audio playback device D is recordable, as shown in FIG. 3. A REC label R on the audio playback device D is depressed or otherwise activated, at which time electrical components are activated for recording an audio message (see FIGS. 6-8, e.g., and accompanying description below). In other forms, the audio playback device D is prerecorded. Generally, the audio playback device D is recordable and re-recordable. In the preferred embodiment, as will be discussed in detail below, a "happy tab" (see tab 52 below and in FIGS. 6-8) may be removed and should only be removed once the user is happy or satisfied with the recording that has been made. Removal of the happy tab is then designed to "fix" or prevent recording over or erasure of the current and last recording made by the user. The "happy tab" is referred to as such as it would, in the most preferred embodiment, have information to a consumer or user that states, for instance, "PLEASE REMOVE ONLY WHEN HAPPY WITH YOUR RECORDING."

Figure 5:
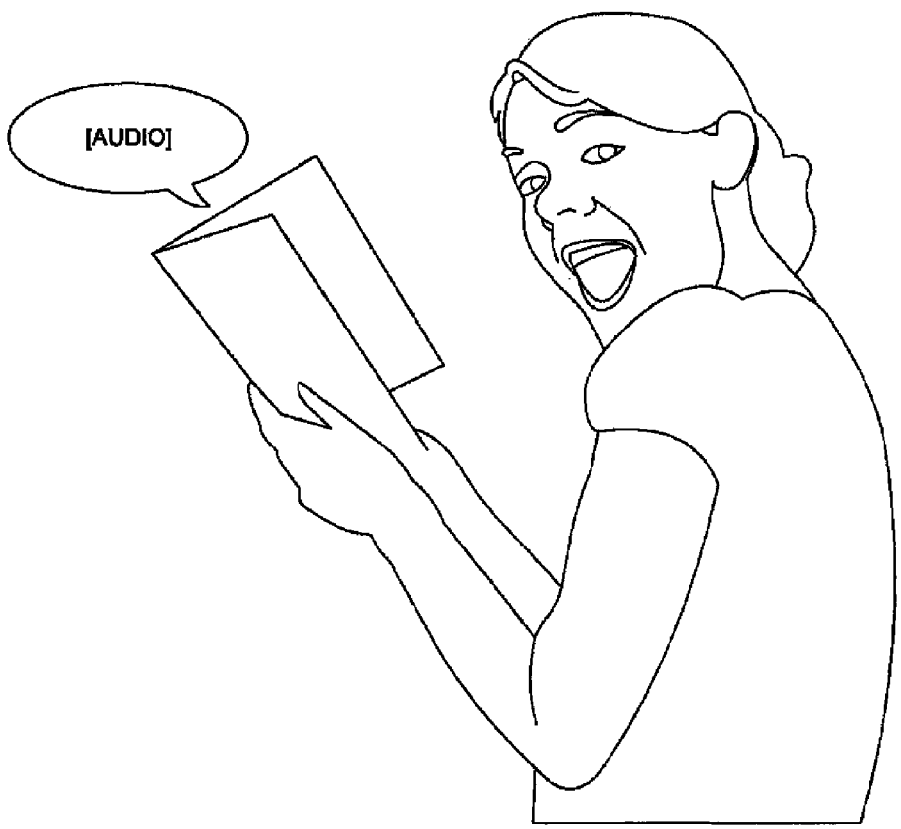
FIG. 5 is a further illustration of usage of the audio playback device of FIG. 1.

As can be seen in FIG. 5, the audio playback device D may be secured via the adhesive A to a greeting card C. As alternatives, the audio playback device D may be secured to any folding or foldable apparatus. This allows a user to turn many items into the equivalent of a personalized greeting card. As examples, a hotel could provide a guest with a bill and include an audio explanation of the charges, or could leave a message thanking the visitor for their stay. A person could secure the audio playback device D in a newspaper presented to someone with their breakfast in bed on their birthday or on mother's or father's day. A gift-giver could secure the audio playback device D in a book that marks a special event, such as a gift of a Bible or a gift of a survival guide for someone going to college. The age-old tradition of surreptitiously slipping notes into people's books or other belongings could be augmented by installing the audio playback device D in the same so that the person unexpectedly stumbles upon the message by hearing the recorded audio, such as by installing the audio playback device D in a suitcase.

Figure 6:
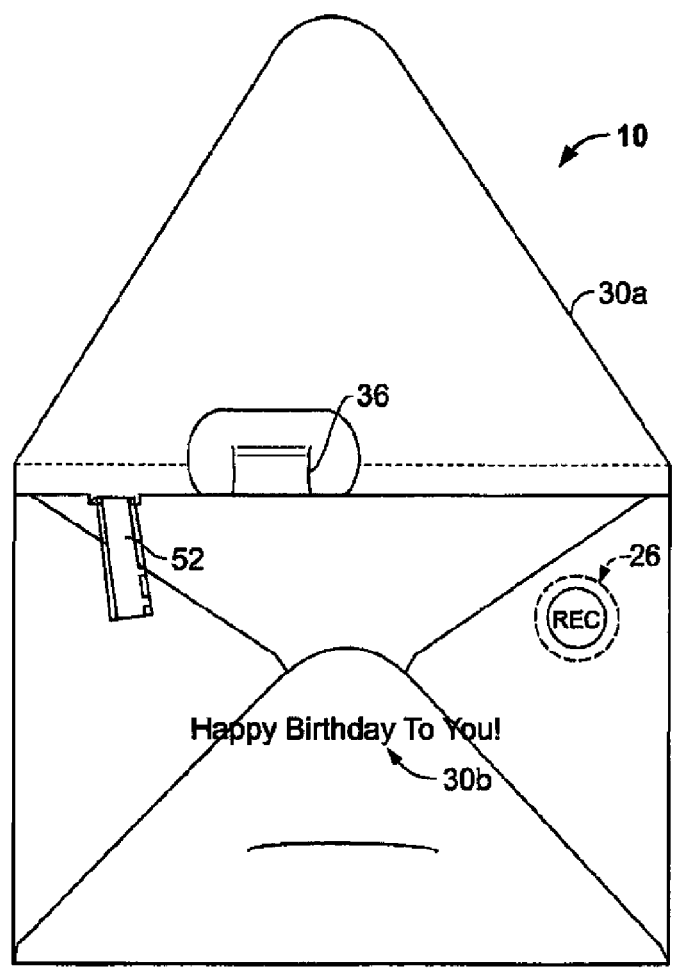
FIGS. 6-8 are illustrations of a single form of the audio playback device.
Figure 7:
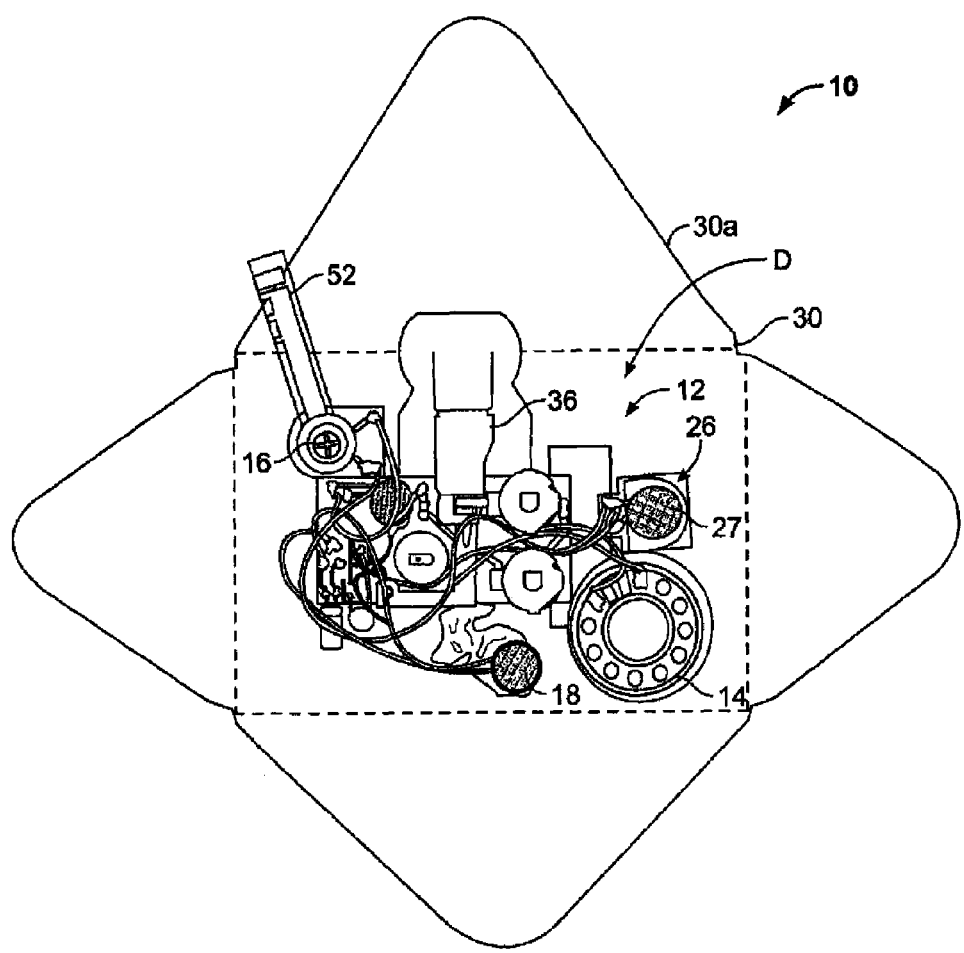
Figure 8:
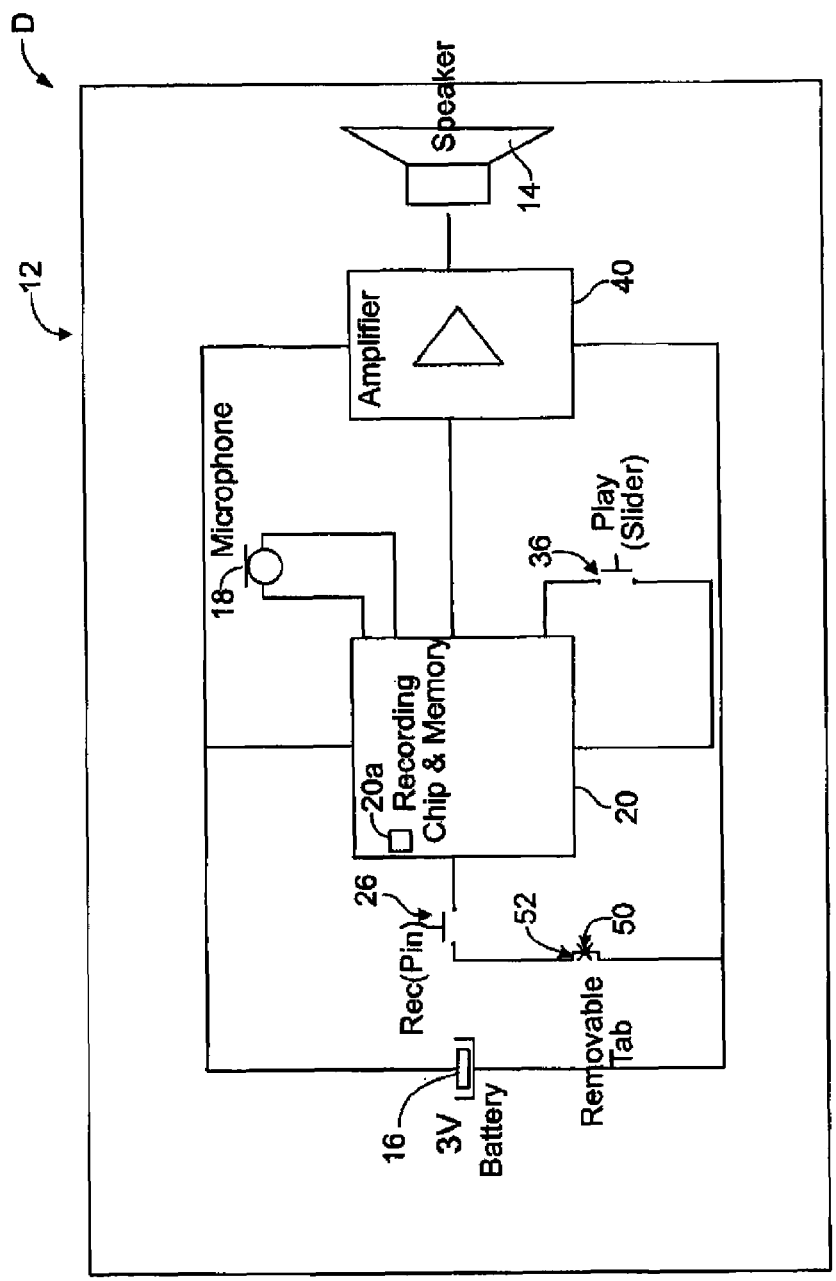

Referring now to FIGS. 6-8, a folding or foldable apparatus is shown as an article carrier illustrated in the form of an envelope 10 having an audio playback device D capable of playing a user selected audio recording, accidental overwriting of the recording being protected and prevented. As used herein, the term prevented is used to mean stopped or the possibility being eliminated unless out-of-the ordinary steps are taken. The user would secure the audio playback device D in the envelope 10 or other apparatus, record an audio recording such as a spoken greeting or user selected music or any other audio recording or combination thereof, lock the recording, and then give the envelope 10 and audio playback device D either as a gift or as a companion to a gift or gift article such as a gift card or certificate, for instance. In this manner, the audio playback device D allows the user to personalize the giving of a gift card that is not typically considered personal.

As described herein, the present forms are often described in terms of a gift or a gift card, or often in terms of one person providing something to another person, and such is meant only in an exemplary manner. It should be noted that one may personalize, individualize, or simply tailor consumer and personal items or the like as one desires, regardless of whether a change of possession is ever intended or actually occurs.

Towards this end, the audio playback device D includes an electronic circuit device 12 including an output component in the form of a speaker 14, a power source in the form of a battery 16, an input component in the form of a microphone 18, and a storage medium in the form of an integrated circuit chip (IC) 20.

In a preferred form, the IC 20 is a re-writeable chip. A user uses the microphone 18 to input an audio stream that becomes the audio recording stored on the IC 20. As the user may, for any reason, be dissatisfied with a first recording, it is desirable to permit the user to change the recording. However, in some forms, it may be desirable to use a write-once integrated circuit.

Initially, the IC 20 is programmed to accept an audio recording. In some forms, the IC 20 may include audio instructions to a user on how to record an audio stream, and such instructions may be overwritten by the user recording their selected audio stream onto the IC 20.

To record a message, a record actuator 26 is provided by depressing the REC label R (FIG. 3). In a preferred form, the record actuator 26 is a switch that generally requires some intentional act to activate. For instance, a hole may be provided in a switch housing, and insertion of a pin into the hole depresses a plate to connect the switch and move the record actuator 26 to a closed circuit position that allows recording to the IC 20. However, it is also recognized that it is difficult for a user to manipulate a pin, for instance, and maintain the pin in the hole as is required while also recording a message. To be more specific and as an example, a user may choose to record an audio stream from an audio source such as a television or another speaker (i.e., a speaker other than the speaker 14 carried by the envelope 10), and such may require moving the envelope 10 and microphone 18 to a position proximate the audio source, and the actuator 26 must be held in the closed position during the recording. In order to minimize frustration and maximize ease of actuation for a user, the record actuator 26 is preferably simply in the form of a button 27. In one form, the record actuator 26 may be provided with a removable or frangible protector or cover so that, prior to a first use, the possibility of accidental actuation is minimized, such as from compression or jostling that may occur during shipping.

Once an audio stream has been recorded to the IC 20 via the microphone 18, the user may desire to review the recording. Generally, the microphone 18 is positioned at an interior portion of the envelope 10, and the envelope 10 includes a body generally formed of a folded paper blank 30. Therefore, the audio stream may be received by the microphone 18 through the paper 30. The record actuator 26 may be operated through the paper 30, which in some forms may have a small hole aligned with the above-described record actuator housing hole. As the recording may be made without opening the envelope 10, playback of the recording may be activated by opening an envelope flap 30a in a manner similar to that which is used in prior art audio-playing greeting cards, specifically, but pulling a play tab 36 to activate the IC 20 to provide the recorded audio to an amplifier 40 and the speaker 14. As can be seen in FIG. 3, the play tab 36 is secured on the other side of a fold F of the greeting card C so that opening of the greeting card C pulls the play tab 36 to activate the playing of the recording.

In other forms, it may be desirable to have the flap 30a opened to an intermediate position in order to record the audio stream, yet calibrate or coordinate the playback to occur when the flap 30a is in a fully-opened position. Advantageously, audio playback is desired when a recipient of the envelope 10 and its contents opens the envelope flap 30a to a position that permits withdrawal of the contents from the envelope 10, which generally requires the flap 30a to be fully-opened. As such, the envelope 10 may be partially opened during recording, with the flap 30a at a less-than-fully-opened position, to improve the clarity of the recording by not requiring the audio stream to pass through the paper 30.

It should be noted that the order of the steps of use may be changed. For instance, a user may record a message prior to removing the backing B and/or prior to securing the adhesive A with the foldable device, such as the envelope 10 or greeting card C.

Once the user is satisfied with the recording, such as by reviewing the playback, the user can lock the recording to the IC 20. In the present and preferred form, the user locks the recording by literally breaking the circuit for the record actuator 26. Turning to FIG. 8, a block diagram of the presently described circuit is shown having the battery 16 connected across the IC 20 and across the amplifier 40 that powers the speaker 14. The battery 16 is also connected to one side of the record actuator 26, which is in turn connected on its other side to the IC 20. A breakpoint 50 is provided between the battery 16 and the record actuator 26. In the present form, the breakpoint 50 is connected to a thin strip of material referred to herein as tab 52 (see FIGS. 6 and 7). The tab 52 may be pulled away from the circuit components so that it breaks away from the circuit and is removed entirely from the audio playback device D. The record actuator 26 is connected to a pin 20a of the IC 20, as is readily understood, and the break at the breakpoint 50 due to removal of the tab 52 prevents power from reaching the record actuator pin 20a, and, thus, the IC 20 cannot be commanded to re-write over whatever audio stream recording is present on the IC 20.

As described then, a user is able to easily use the button 27 to record a message or audio stream to the IC 20, without difficulty that may be experienced with other types of record actuators. Yet, despite the ease of recording by pressing the button 27, the audio playback device D provides the ability to lock the recording on the IC 20, and prevents the accidental overwriting of the recording, by allowing the simple and elegant tab 52 solution for breaking the circuit and preventing power to reach the record actuator pin 20a on the IC 20.

The present invention in the form of the audio playback device D allows a user to provide a highly personalized gift presentation to a recipient. The user may select an envelope 10 or any other folding/foldable apparatus. The audio playback device D provides an easy-to-use button 27 to record a message or other audio stream to personalize the envelope 10. The breakpoint 50 allows the user to make sure that the ease of the button 27 does not result in accidental or inadvertent overwriting of the recorded audio stream, as well as prevents re-use or 're-gifting' of the audio playback device D. The audio playback device D is thus able to be used with any folding/foldable article for presentation as a gift, particularly an article such as a gift card that is generally not considered personal to a recipient.

It should be noted that the electronic circuit device 12 may be in a variety of forms, including a simple electronic circuit device commonly employed in greeting cards with a permanent recording, more complex electronic circuit devices employed for user-recordable media, and the above-described recordable/re-recordable devices including a method or component for permanently/semi-permanently fixing the recording thereon, and combinations of both (for instance, a device which plays both a pre-recorded audio track and a user-recorded audio track).

Figure 9:
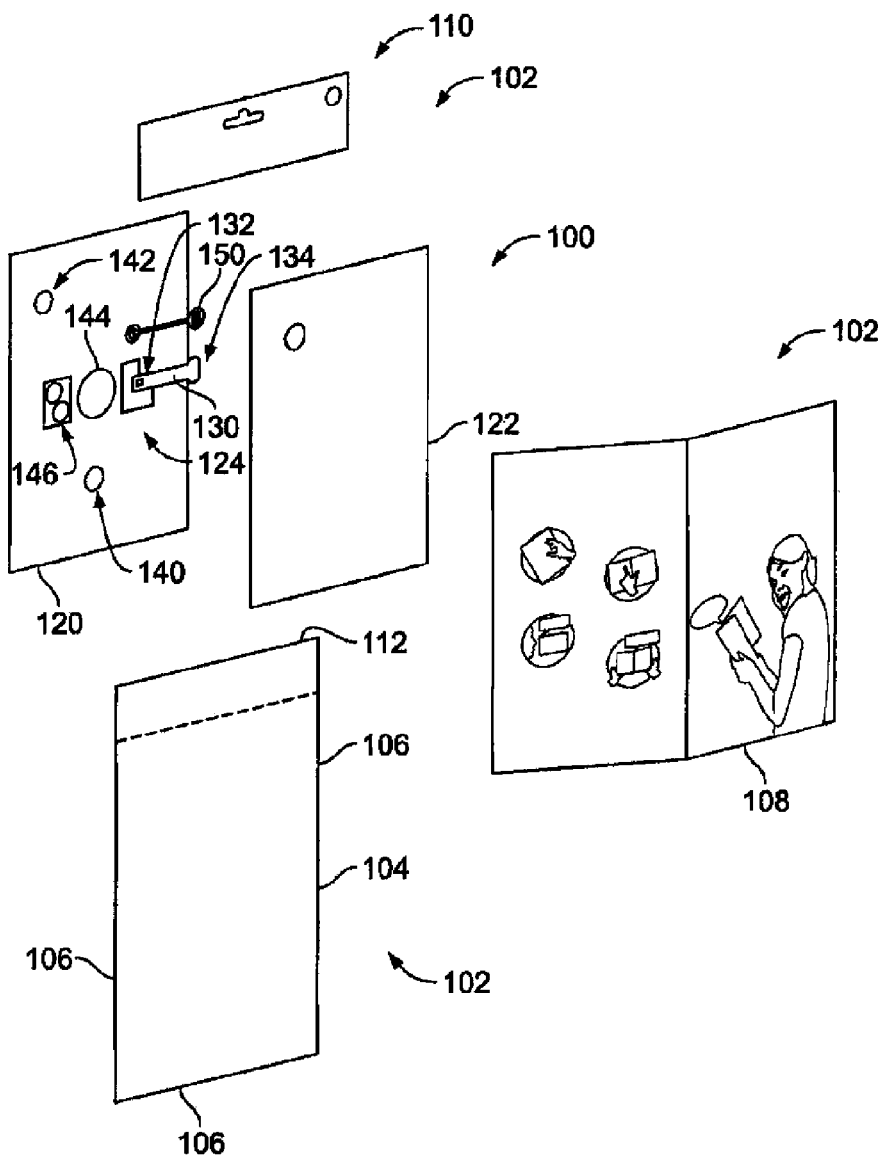
FIG. 9 is an exploded illustration of one exemplary product of a first embodiment, the product being a "slider"-type audio playback device, and packaging therefor.

Turning now to FIG. 9, a form of the present invention is illustrated as audio playback assembly 100, shown in an exploded view with a form of packaging 102. The packaging includes a plastic or polybag 104 of generally two sides, folded or heat-sealed around three edges 106. The assembly 100 is received within a graphic or cover 108, and the assembly 100 and cover 108 are then placed inside the polybag 104. It should be noted that, in a form, the assembly 100 and cover 108 may be placed between two sheets of poly material, and the bag 104 may then be formed (such as by cutting/heat-sealing) therearound. Once the assembly 100 and cover 108 are disposed within the polybag 104, a hanging tab 110 or other item may be secured to a top 112 of the polybag 104 to provide for display, as an example. The assembly 100 includes a back or backing 120, a cover 122, and an audio module 124 between the backing 120 and cover 122.

The assembly 100 may be constructed in a number of manners. One or both of the backing 120 and cover 122 have a surface including adhesive facing the other, and the module 124 may be secured between the backing 120 and cover 122 by the adhesive or may be built into the backing 120, for instance. In one form, either the backing 120 or cover 122 is removable (i.e., may be peeled away from the assembly 100) in order to expose the adhesive, and the rest of the assembly 100 may then be adhered to another item (such as a book, greeting card, picture frame) via the adhesive (with the module 124 directly in contact with the item). In another form, either the backing 120 or the cover 122 has a second layer of adhesive and a removable adhesive backing (not shown) which is removed to allow the backing 120, module 124, and cover 122 to be secured to another time as a single unit.

The illustrated audio module 124 is a "slider"-type assembly, similar in operation to others of the devices discussed herein. That is, the module 124 includes a slider 130 having a first end 132 mechanically connected with the electronic circuitry of the module 124 so that movement of the slider 130 acts as an on/off mechanism. The assembly 100 is installable within an item (not shown), such as a folding item device, so that the assembly 100 is generally fixed relative to a first portion (not shown) of the item. Then, a second end 134 of the slider 130 is connectable with a second portion (not shown) of the item, the second portion being movable relative to the first portion. When the first and second portions are moved, relative to each other, the slider 130 is pulled or pushed relative to the rest of the module 124 and assembly 100 to turn on or off the playback feature of the module 124, In greater detail, it can be seen that the module 124 includes a play button 140 and a record button 142. These, then, allow the present form of the assembly 100 to record an audio message, and to provide playback to a user in a manner other than by using the slider 130 (the play button 140 being useful, for instance, if the person recording the message has not secured the assembly 100 with an item, which may be the case if the assembly 100 is a gift). The module 124 further includes a speaker 144 and a battery (batteries) 146 and a variety of electronics for operating the device. Like other embodiments discussed herein, a frangible tab 150 is supplied that permanently fixes the recording and disables the record feature.

It should be emphasized that the cover 122 (or backing 120) may be removed for securing the assembly 100 with an item. In particular, a photo print may be secured over the module 124 and backing 120 after the cover 122 has been removed, converting the photo print into a part of the overall assembly 100.

Figure 10:
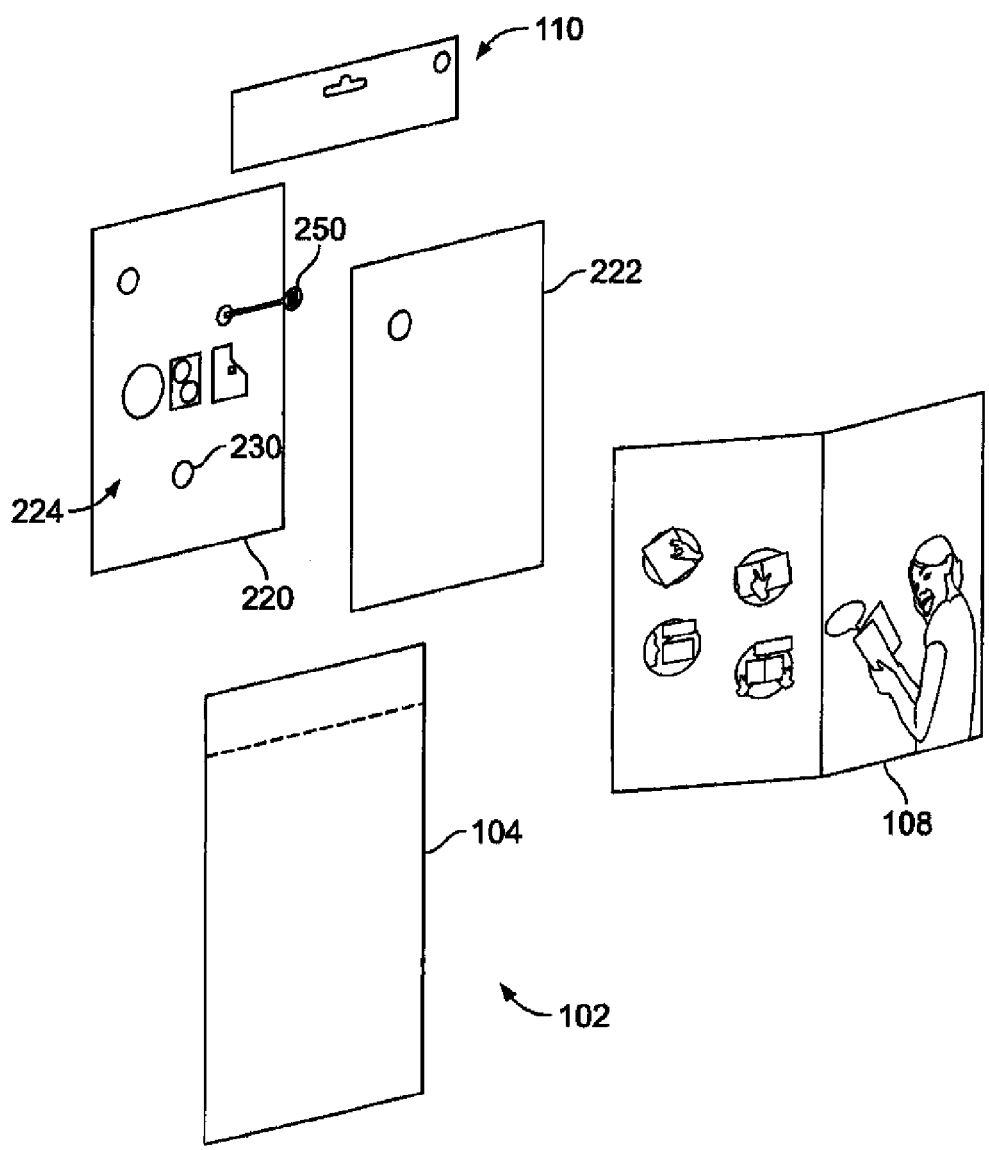
FIG. 10 is an exploded illustration of another exemplary product of the first embodiment, the product being a "button"-type audio playback device, and packaging therefor.

Turning now to FIG. 10, a second form of an assembly 200 is illustrated. The assembly 200 is depicted with packaging 102 as discussed above. The assembly 200 also has a backing 220 and cover 222, generally similar to those discussed for the assembly 100.

The assembly 200 also has a module 224 similar, but not identical, to the module 124, including a frangible tab 250. In particular, the module 224 is a "button"-type module, that is, having no slider 130. Instead, the module 224 is only activated by depressing the "play" button 230, as is illustrated.

As used herein, audio playback shall refer to any audio, whether it be pre-recorded or and 10, it should be noted that the record button would be omitted in a form that does not permit recording of audio tracks by a user, instead being pre-installed.

Embodiment 2

Multimedia Photo Album or Photobook

Figure 11:
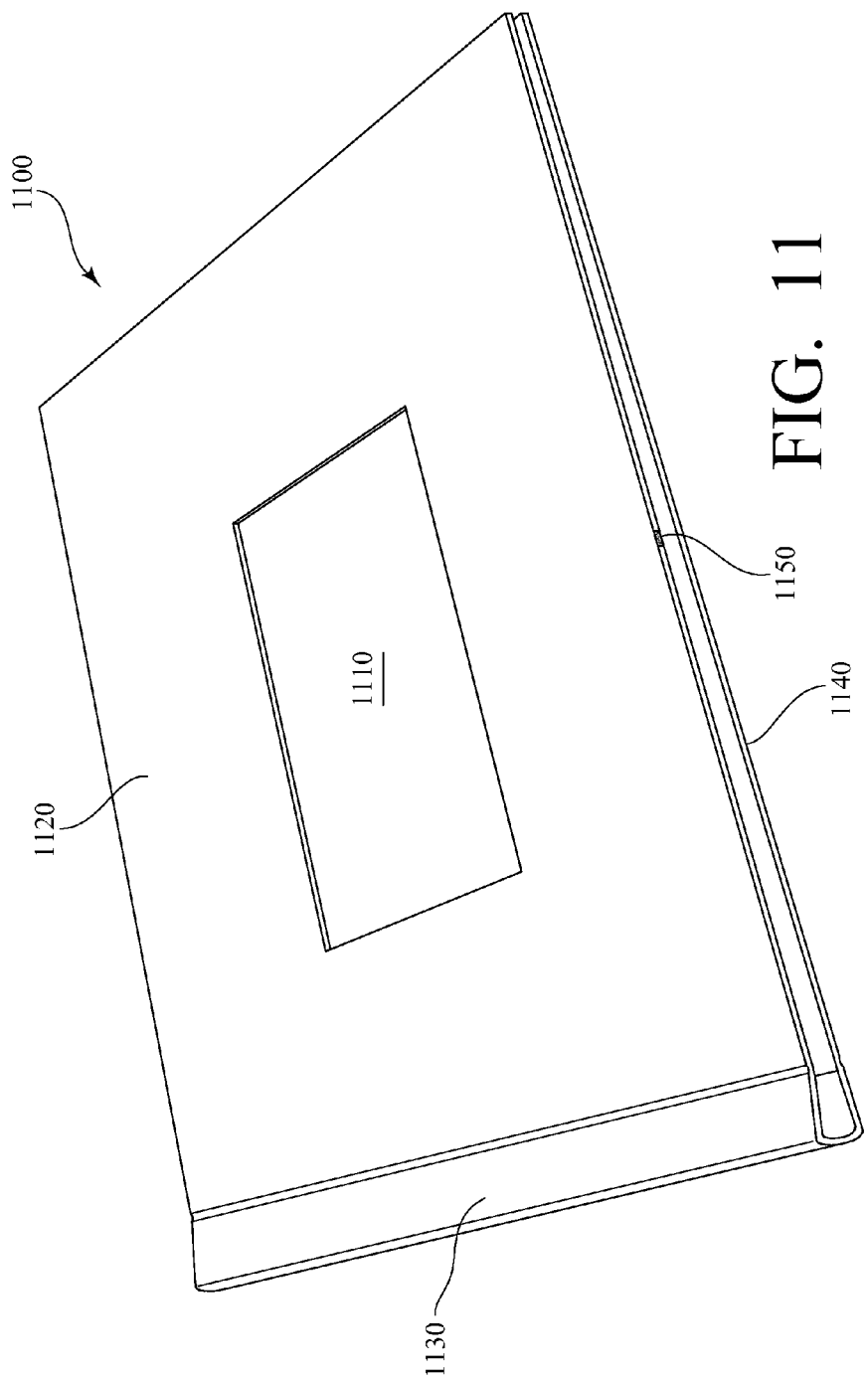
FIG. 11 illustrates an exemplary product of a second embodiment, the product being a photo album having data storage and/or electronic display and audio capabilities shown in closed configuration.

Turning now to Embodiment 2, as set forth in more detail and with reference to FIGS. 11 through 20), a playback/display device 1100 is disclosed in the form of what, at first blush, appears to be a conventional photobook or photo album, in closed arrangement, which has a window 1110 cut through on the front cover 1120 through which is (or would be) displayed the photograph appearing on the first conventional photograph page inside of the photo album. The photo album 1100 includes a conventional spine 1130, and a back cover 1140, that can only partially be seen in FIG. 11. Unlike conventional photo albums, however, the present photo album 1100 includes a data port 1150, that is preferably built into a side of the front cover 1120. The data port can be of any conventional known or future data transfer form or format, such as a conventional USB port, a mini-USB port, a proprietary data port, such as used by Apple® for its iPod®, iPhone®, and similar proprietary multimedia devices. The port 1150 can also be configured to receive a data memory card, as may be used by some mobile phones, digital cameras, and digital video recorders, or it could be in the form of an HDMI input, or an older multi-jack audio/video (A/V) cable input, or the like. The placement of the data port 1150 is arbitrary and is shown in FIG. 11 in just one of many possible or exemplary locations. However, as will be appreciated by one skilled in the art, as shown by its alternate location in FIG. 12, the placement of the data port 1150 can be at any location on or within the front cover 1120 that is convenient to the user of the product, that is aesthetically pleasing, and that still provides enough space within the cover 1120 to house its electronic components and hardware without interfering with or being interfered by the photograph cut through window 1110. In additional embodiments that will be described hereinafter, placement of the data port 1150 may also need to take into account and be conveniently located relative to other electronic components that may be included with the front cover, including, for example, recording, data storage, power supply, computer or control processor(s), display/screen(s), speaker(s), microphone, playback controls, and any other user interface components. It will also be understood by those skilled in the art that although the present application discusses inclusion of various hardware and software components in or integral with the front cover of the photo album, such components could alternatively and easily be located in or integral with the back cover of the photo album or, in yet a further embodiment (not shown), in or integral with a special insert panel that fits within and among the collection of photograph storage sheets and is not part of the front or back covers.

Figure 12:
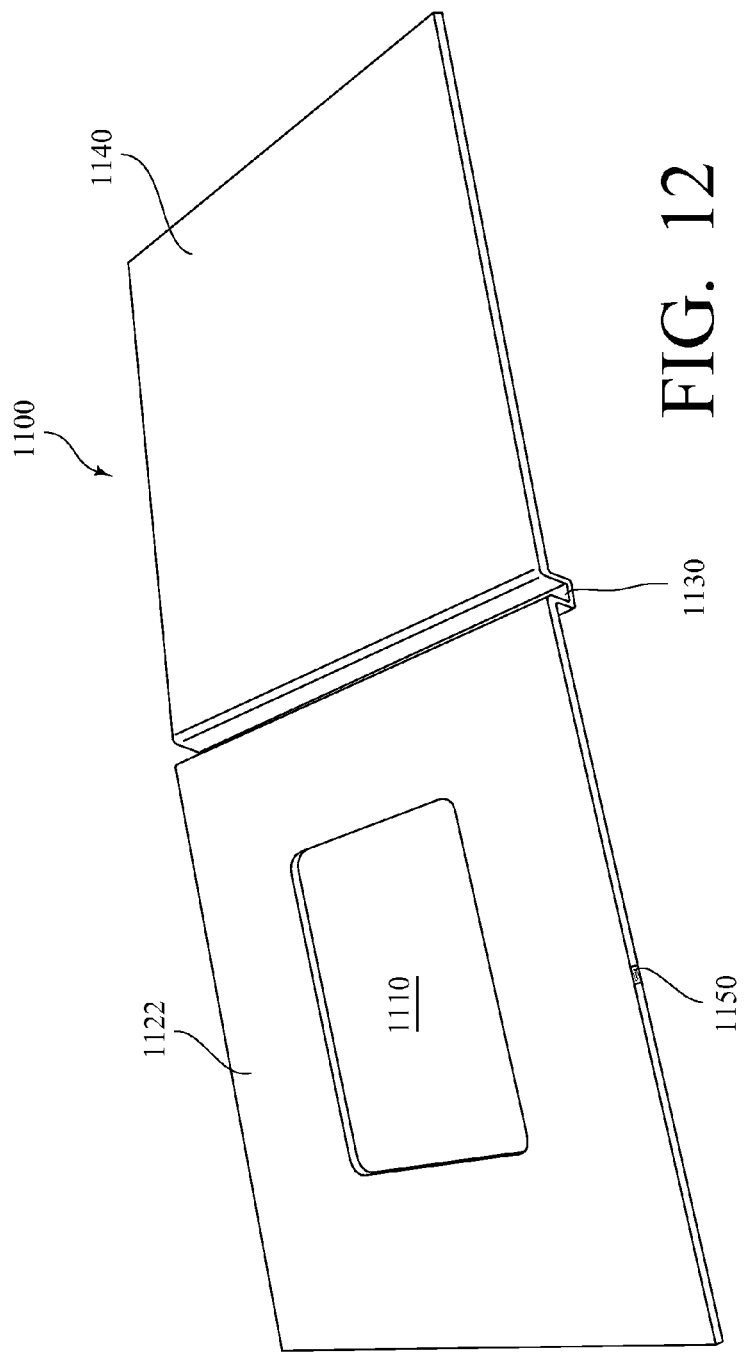
FIG. 12 illustrates the exemplary product of FIG. 11 in an open configuration.

FIG. 12, as already alluded to, illustrates the playback/display device 1100 from FIG. 11 in the form of a photobook or photo album in an "open" position, but in which no photograph pages have currently been inserted into the spine 1130. It should be noted that no recording, data storage, power supply, computer or control processor(s), display/screen(s), speaker(s), microphone, playback controls, or any other user interface components are built into the front cover 1120 or shown on the inside cover 1122. In this particular embodiment, the data port 1150 and its corresponding data storage components are simply used as a convenient means or method of storing electronic copies of some or all of the photographs that appear in the photobook or photo album. In such an embodiment, the inside cover 1122 would appear as a conventional, clean mat.

Although not shown, and as an additional side note, it will be appreciated by one skilled in the art that some photobook or photo albums will not have a photograph cut through window 1110, which actually makes the design and layout of any electronic components within the front cover 1120 easier—although the cut through window 1110 does not pose that difficult of a design hurdle.

FIGS. 13A and 13B merely illustrate in closer detail one embodiment of the data port 1150, as built into the side wall 1124 of the front cover 1120. As shown, this particular data port 1150 is a mini USB type port, which is one of the preferred port types because of its compact size and profile, which enables it to fit well within the interior of the front cover. FIG. 13B shows the data port 1150 from a perspective view. FIG. 13A merely illustrates a top down, cut-away view of the inside of the front cover 1120, which shows one possible location and arrangement of the additional and conventional electronic components and hardware 1155, such as a printed circuit board (PCB) with memory and processing modules thereon, associated with the data port 1150, and how such components and hardware 1155 fit within the space between the edge 1102 of the front cover and the edge 1112 of the cut through window. 1110. Other than the jack or plug-in portion of the data port 1150, the additional electronic components and hardware 1155 will generally be housed completely within the front cover 1120 and generally not viewable or accessible to a routine user of the playback/display device 1100.

FIGS. 14A and 14B illustrate an alternative playback/display device 1400 in the form of a conventional photobook or photo album, in open arrangement, similar to the photobook or photo album shown in FIG. 12, but instead of having a data port built into the side of the front cover for data storage, the front cover includes a cavity 1410 sized to house a removable USB flash drive 1420. Preferably, the flash drive 1420 has a retractable USB connector 1430 that retracts in conventional manner into the flash drive housing using slide lever 1440. Preferably, the flash drive 1420 fits into the cavity 1410, which includes a slight indent to enable the user to remove the flash drive from the cavity 1410. Preferably, the flash drive 1420 includes L-shaped feet to enable the flash drive 1420 to "lock" into the storage cavity 1410—at least locked in enough to keep it from falling out inadvertently.

FIGS. 15A, 15B, 15C, and 15D illustrate yet another alternative playback/display device 1500 in the form of a conventional photobook or photo album, similar to the photobook or photo album shown in FIG. 12. FIG. 15A only illustrates the inside cover 1522 of the playback/display device 1500. In contrast with the album from FIG. 12, in which the built-in data storage device has its data port built into the side of the front cover, the data port 1550 in this alternative embodiment is built into a cavity 1530 within the interior surface of the inside cover 1522. The data port 1550 illustrated is shown, again, as a mini USB port; however, as stated previously, this type of port is merely shown as an example of many different types of data ports that may be used. Preferably, this data port 1550 is configured to pivot, as shown between FIGS. 15C and 15D. The data port 1550 pivots up when needed for connection with a USB cable and to pivot back down flush (or below flush with the surface of the inside cover 1522 when not needed. As shown in FIG. 15B, the data port 1550 is designed to pivot about post 1540. The data storage component 1560 to which the data port 1550 connects is shown in FIG. 15A.

Figure 16:
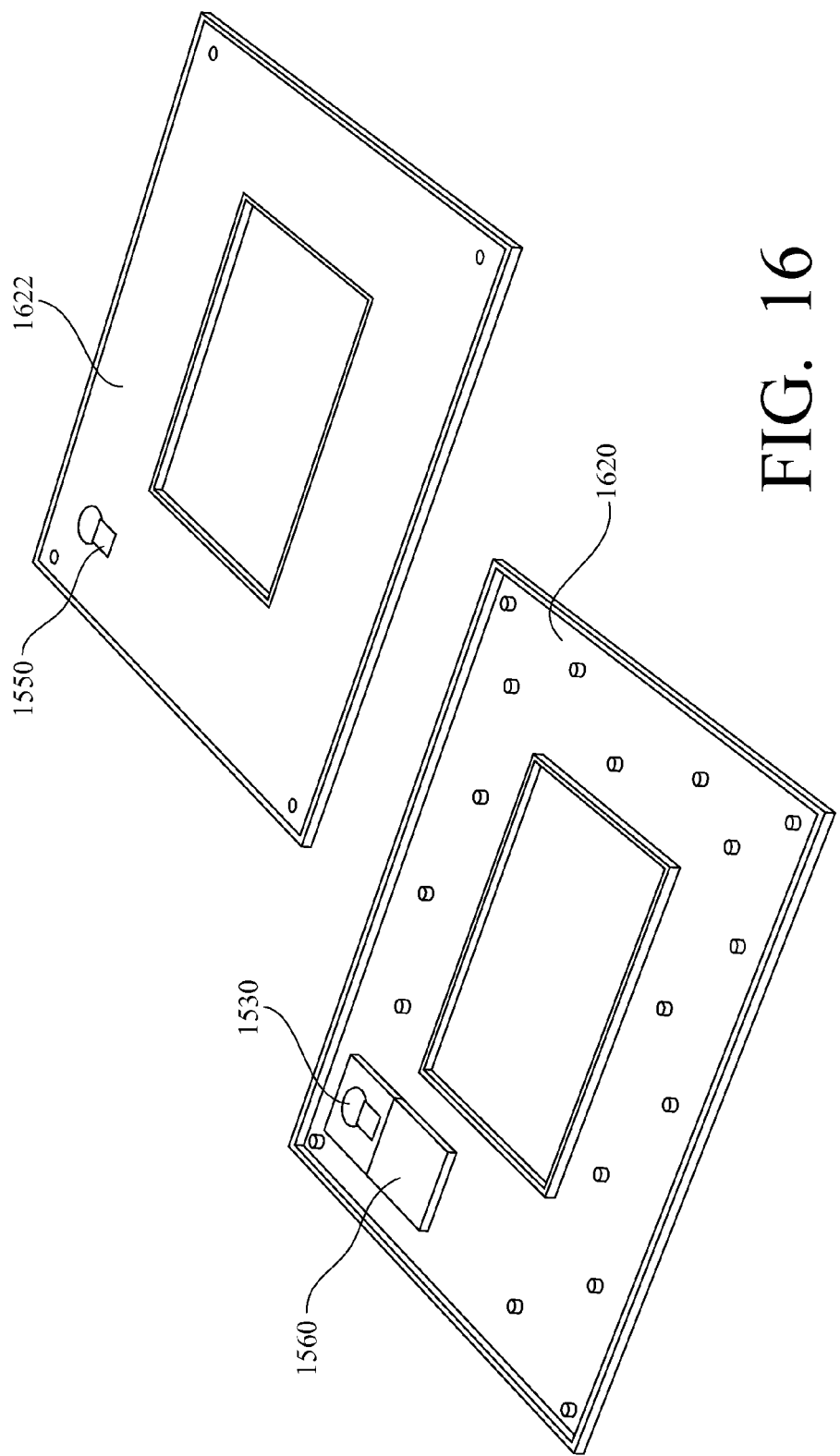
FIG. 16 illustrates an exemplary plastic mold or protective casing for use with the product of FIGS. 15A through 15D.

FIG. 16 illustrates the pivotable data port 1550 of FIGS. 15A-15D when it has been installed between two plastic mold covers 1620, 1622, that are used to house and protect the electronic components when they are installed within the front cover 1520 of the photo album.

Figure 17:
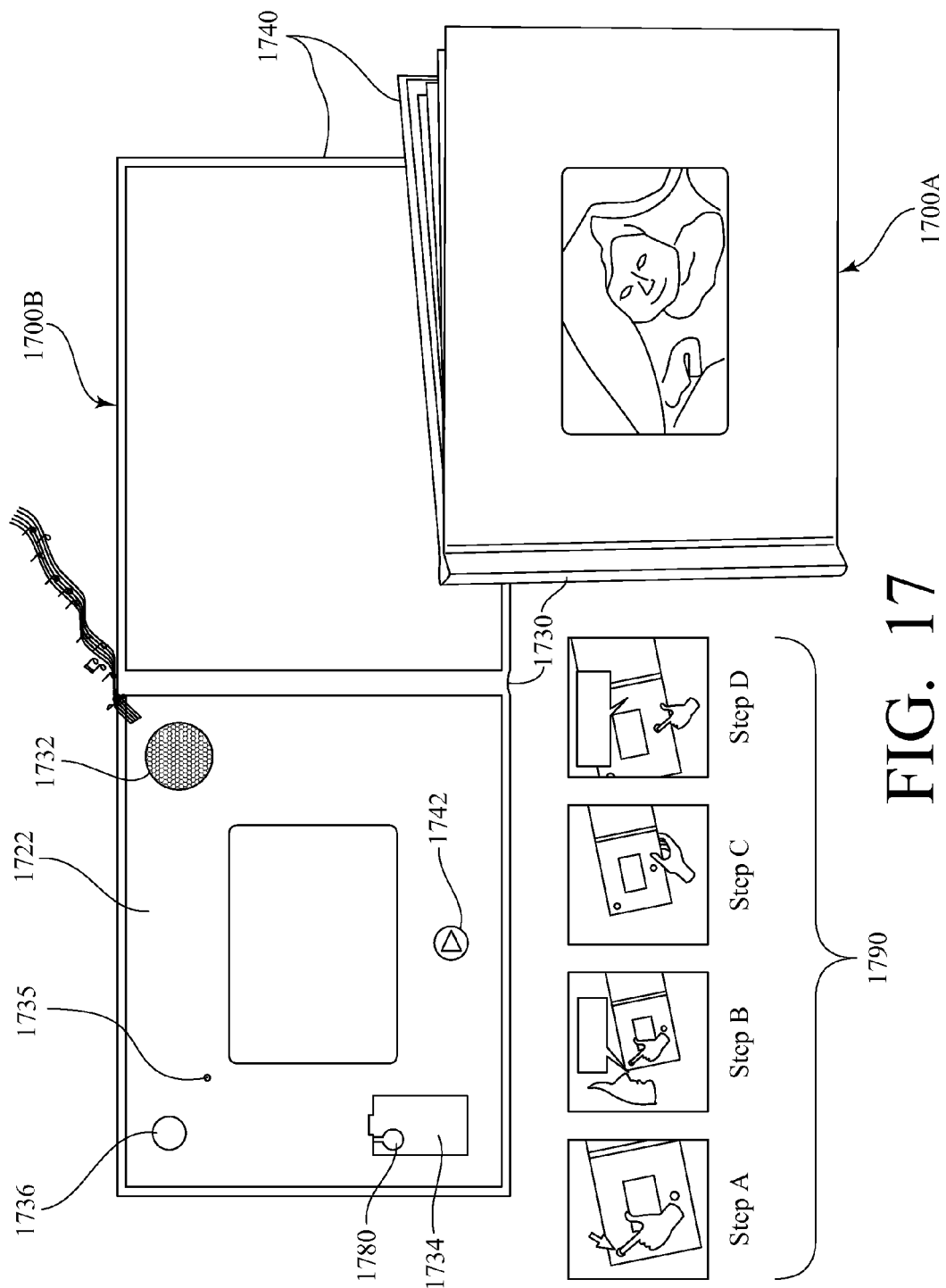
FIG. 17 illustrates a fourth exemplary product of the second embodiment having an audio recording and playback capability.

FIG. 17 illustrates an alternative playback/display device 1700 in the form of a photobook or photo album (shown in both closed arrangement 1700A and also shown in open arrangement 1700B). The photo album 1700 includes a window 1710 cut through the front cover 1720 through which is displayed a photograph 1715 appearing on the first conventional photograph page inside of the photo album 1700. The photo album 1700 also includes a conventional spine 1730, and a back cover 1740. In this embodiment, the playback/display device 1700 does not include a data port for uploading or storage of data, but rather, combines the audio recording capability, as described in more detail with respect to Embodiment 1, with a photo album 1700. The front cover 1722 includes a recordable/re-recordable capability so that a user can record and permanently store a message for later playback as desired. Accordingly, the front cover 1722 includes installed therein a speaker 1732, a battery module and cover 1734, and a record button 1736 for recording/re-recording a message, when depressed. A memory storage component or medium (hidden behind the inside cover 1722) is in electronic communication with a microphone 1738 (that may or may not be visible) through the inside cover 1722. A "happy tab" 1780, as described previously, is provided to prevent the overwriting of the recorded message; however, it is not intended to be removed until the recorded message has been finalized and the user is happy with the recorded version. As long as the happy tab 1780 remains in place, the memory chip or similar memory storage can, preferably, be overwritten as many times as necessary. The amount of recording time is configurable and is limited only by the size of the memory storage capacity. A playback button 1742 is provided to listen to the recorded message through speaker 1732, though it should be recognized that the photo album 1700 may be provided with a greeting-card type tab actuators positioned between the front and back covers 1720, 1740 that activates playback of whatever has been recorded and stored in memory whenever the photo album is moved from a closed to an open configuration. Panels 1790 illustrate, graphically, Steps A through D for recording and playing a recorded message, which would typically be included with or as instructions that accompany sale of the photo album 1700.

As will be appreciated by those skilled in the art, the actual size, textures, and materials used for the photobooks and photo albums may vary greatly. Grey board has been shown to be a good base surface for such photo albums because it is easy to cut and shape into a desired size, whether or not a see through window is included, and it has a porous surface that readily receives whatever design print is desired for the outer surface of the photo album and does so without showing imperfections in the gray board surface, that might be more readily noticeable if or when a less porous material, such as plastic, is used.

Figure 18:
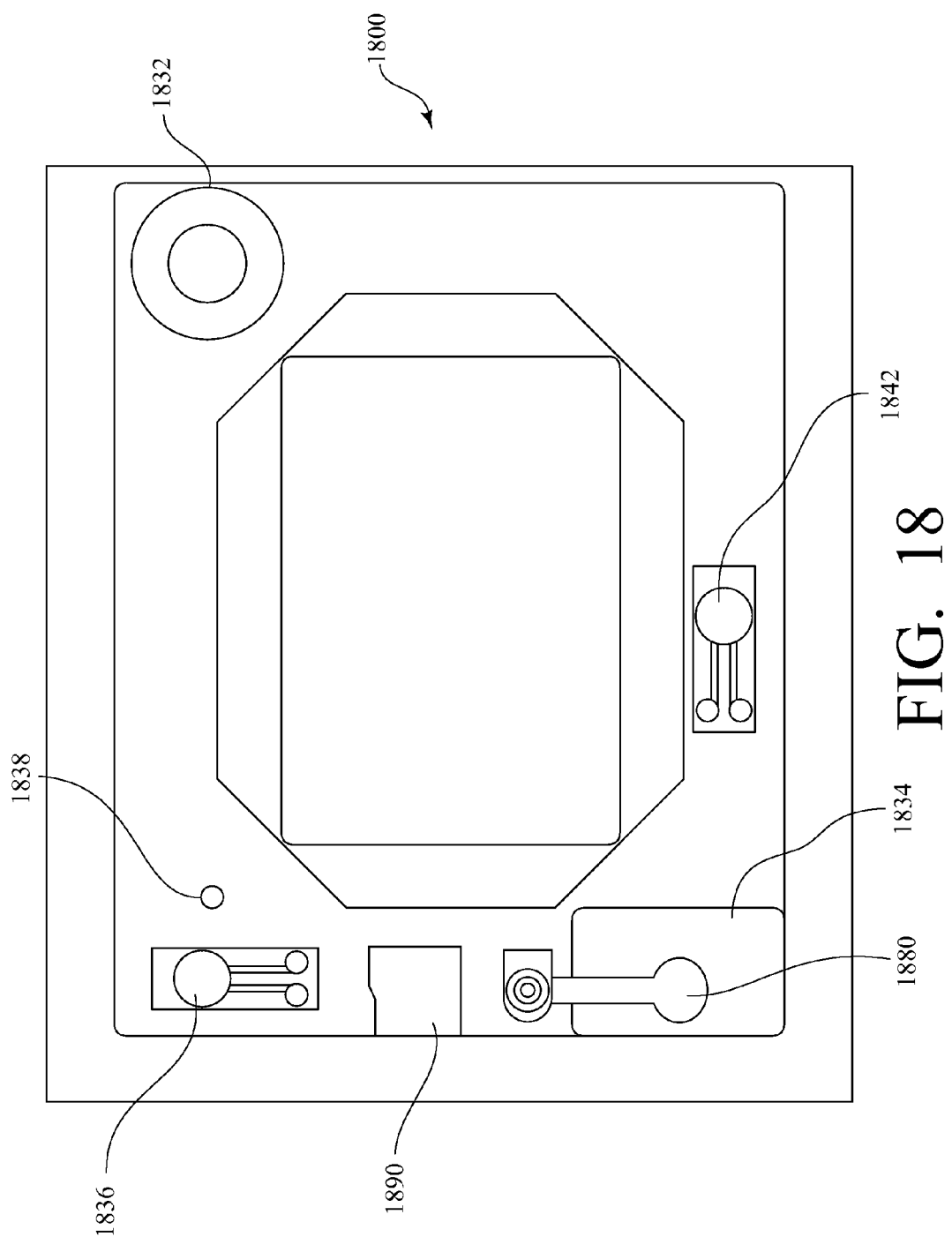
FIG. 18 illustrates, schematically, the electronic components housed within the fourth exemplary product of FIG. 17.

FIG. 18 illustrates the electronic components and modules stored within the inside cover of the alternative playback/display device 1700 from FIG. 17. The electronic circuitry enables the recordable/re-recordable capability so that a user can record (and re-record, if necessary) and then permanently store a message for later playback, once the user is satisfied with the final recording. It should also be understood that the playback/display device 1700 may include a pre-recorded audio recording or a combination of a pre-recorded audio recording with the option of allowing the user to add or append a user-created audio recording as well. Alternatively, there may be a pre-recorded audio message that is initially stored on the device, but recorded over by the user with the first personalized recording. Accordingly, the electronic circuitry includes a speaker 1832, a battery module and cover 1834, and a record button 1836 for recording/re-recording a message, when depressed, as long as the happy tab 1880 has not been removed. A memory storage component or medium 1890 stores the recorded audio and is in electronic communication with the microphone 1838. Happy tab 1880 is provided to prevent the overwriting of the recorded message; however, it is not intended to be removed until the recorded message has been finalized and the user is happy with the recorded version. As long as the happy tab 1880 remains in place, the memory chip or similar memory storage 1890 can, preferably, be overwritten as many times as necessary. When the happy tab 1880 is removed, it breaks the power supply/connection to the memory storage, which prevents any further recording of an audio message stored therein. The playback button 1842 is provided to listen to the recorded message through speaker 1832.

Figure 19:
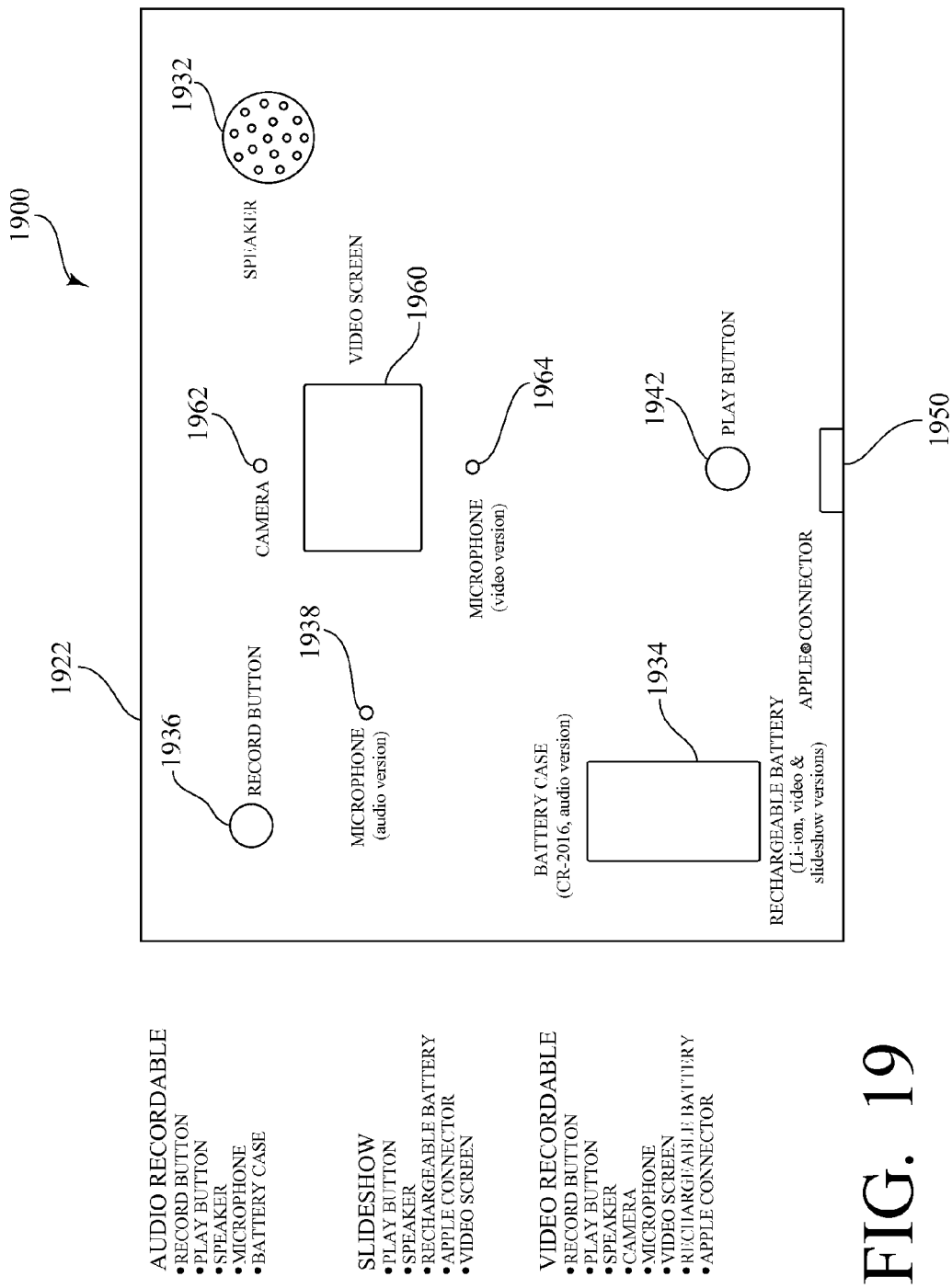
FIG. 19 illustrates the user-interface components of a fifth exemplary product of the second embodiment having audio, photo, data storage, and video recording and playback capabilities.

FIG. 19 illustrates yet a further embodiment of a playback/display device 1900 in the form of a photobook or photo album. The inside front cover 1922 is shown schematically and shows all of the components that may be used for three different multimedia experiences or capabilities: (i) for audio recording only (as described in association with FIGS. 17 and 18), (ii) for slideshow capabilities, or (iii) for video upload or recording. Although all of the components are illustrated schematically within this single FIG. 19 for all three multimedia experiences or capabilities, it should be understood that the playback/display device 1900 can be configured to have any single capability or combination of capabilities. FIG. 19 is specifically configured for interfacing with an Apple® type of data storage and/or multimedia device, such as an iPod, iPad, iPhone, and the like, and therefore includes an Apple-specific data port 1950. The front cover 1922 includes installed therein one or more speakers 1932, a battery module and cover 1934, and an audio record button 1936 for recording/re-recording a message, when depressed. A memory storage component or medium (hidden behind the inside cover 1922) is also included and used to store any data (audio, images, multimedia/video, audiobooks, print versions of books, ring tones, podcasts, and any similar types of files typically used by or storable on a Apple®-type device) recorded or uploaded to the playback/display device 1900. The front cover 1922 further includes at least one microphone 1938 (that may or may not be visible) through the inside cover 1922. Preferably, the microphone 1938 is only used for pure audio recordings. A happy tab 1980 (not shown) is optionally provided to prevent the overwriting of a recorded audio message. A playback button 1942 is provided to listen to the recorded message through one or more speakers 1932. Preferably, if the playback/display device 1900 is only going to be used for and have components for audio recording capabilities, it is preferable and cheaper to have and use replaceable batteries. For slideshow or image capabilities, such photos and images are preferably uploaded using the Apple data port 1950. The play button 1942 may be used to start or scroll through the uploaded images that are preferably displayed on display screen 1960. For video recording or upload capabilities, videos may be uploaded using the Apple data port 1950 and played or displayed on display screen 1960, with audio output coming through speaker(s) 1932. Alternatively, videos may actually be created by the playback/display device 1900 itself, using camera 1962 and video microphone 1964. As stated previously, in some embodiments, a single microphone may be used for both pure audio recordings as well as for the video recordings. Again, any stored or recorded video may be played or displayed on display screen 1960, with audio output coming through speaker(s) 1932. For image or video usage, it is preferable that the batteries be rechargeable—being recharged through the power supply provided through the Apple connector. Further, as will be appreciated by those skilled in the art, the display screen 1960 may be a simple display or it may include touch-screen capabilities and controls to provide the user with a broader experience and more control on viewing or scrolling through the data stored in the playback/display device 1900 and/or more control in playing, rewinding, fast forwarding, or pausing through any of such data being played, viewed, or otherwise accessed on the playback/display device 1900.

Figure 20:
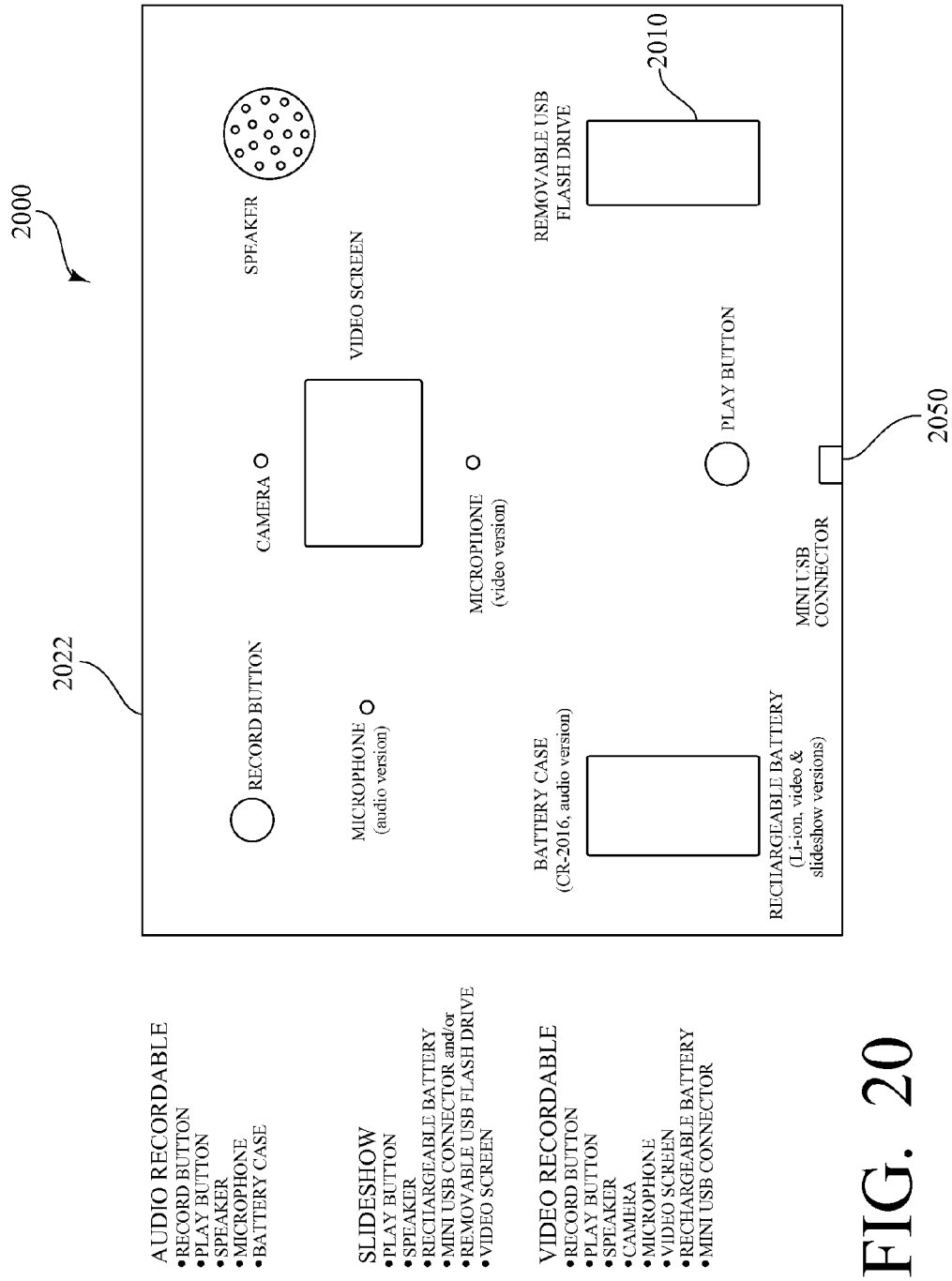
FIG. 20 illustrates the user-interface components of a sixth exemplary product of the second embodiment having audio, photo, data storage, and video recording and playback capabilities.

FIG. 20 illustrates a similar playback/display device 2000 in the form of a photobook or photo album, similar to the one shown in FIG. 19. The inside front cover 2022 is shown schematically and shows all of the components that may be used for three different multimedia experiences or capabilities: (i) for audio recording only (as described in association with FIGS. 17 and 18), (ii) for slideshow capabilities, or (iii) for video upload or recording. In this embodiment, the data port 1950 is shown as a mini USB port or any non-proprietary data input port, as described previously. Data may also be uploaded and/or stored using removable USB flash drive 2010. The other components and functionality of playback/display device 2000 are essentially similar to that of playback/display device 1900 from FIG. 19.

As will also be appreciated, in some alternative embodiments (not shown) of the display devices described with reference to FIGS. 19 and 20, it is possible to include a display screen on the front cover of the photo album, facing outward, so that it permits the display of one of more photographs or videos digitally stored with the device when the photobook or photo album is closed. Alternatively, it is possible and may be desirable to have two separate displays—one of the outside of the front cover that faces outwardly (not shown) and one on the inside cover that faces inwardly (as shown in FIGS. 19 and 20). Such displays could be aligned in back to back orientation or offset from each other, as desired. Further, in a dual display mode, the displays may be configured to show the same multimedia data as each other or they may be configured to show different data—all within the desire and design of the user and/or as permitted by the designer of the controller of the electronics. In addition, as previously stated, such displays may simply be viewable displays, or they may be touch-screen type displays as are commonly and more frequently being used with mobile phones, smart phones, and similar multimedia devices.

Additional Embodiments and Product Designs

Figure 21:
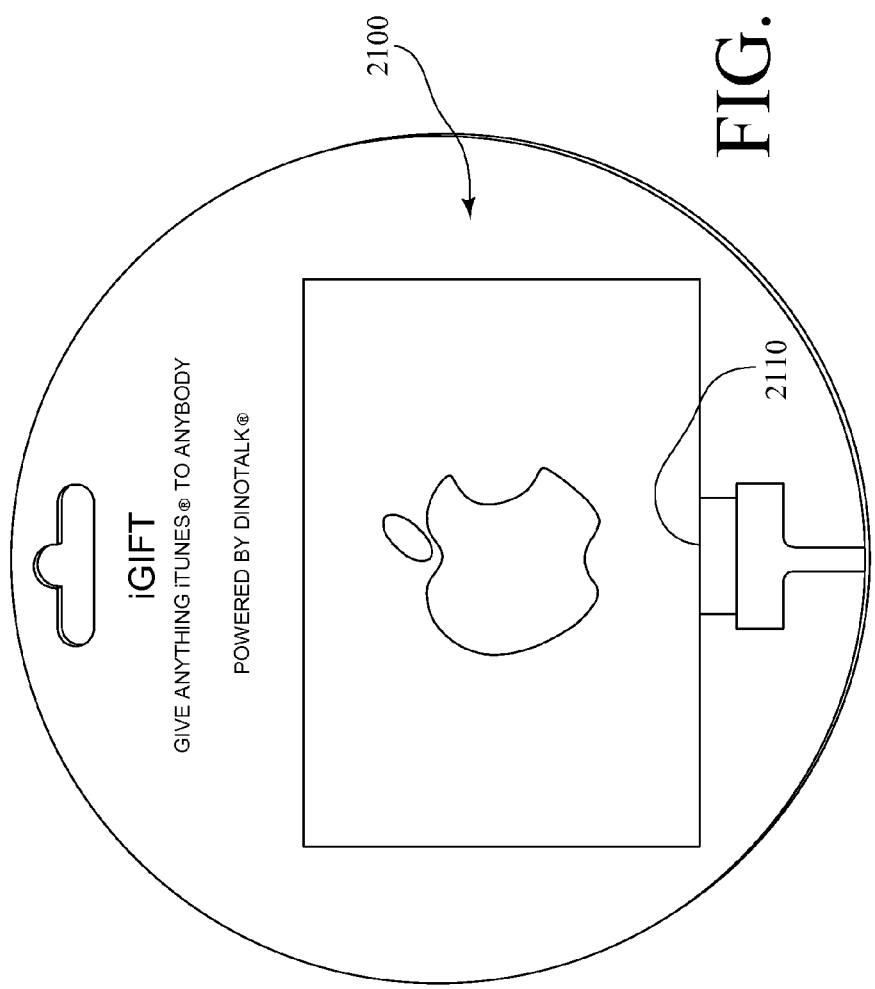
Figure 22:
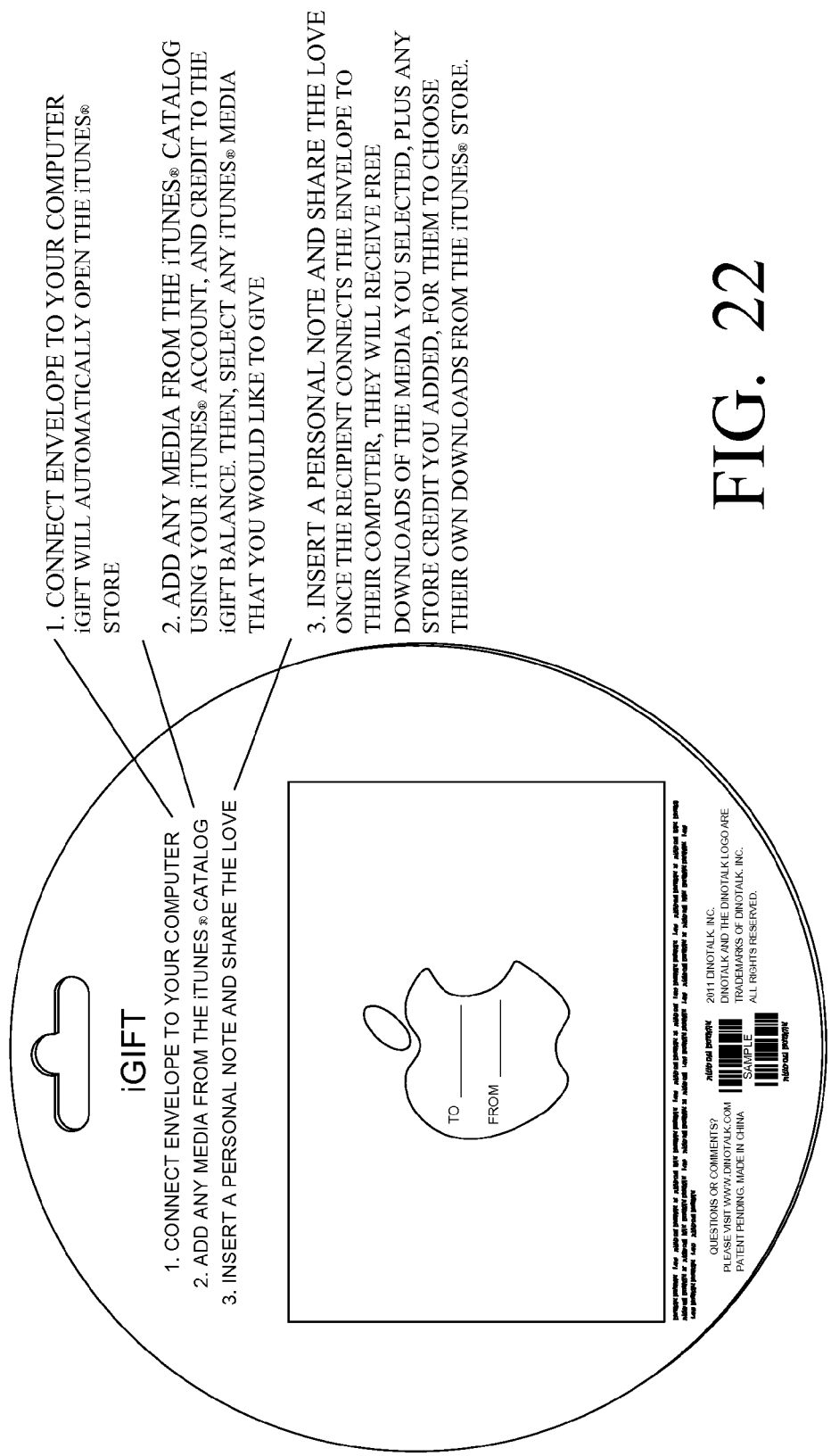
Figure 23:
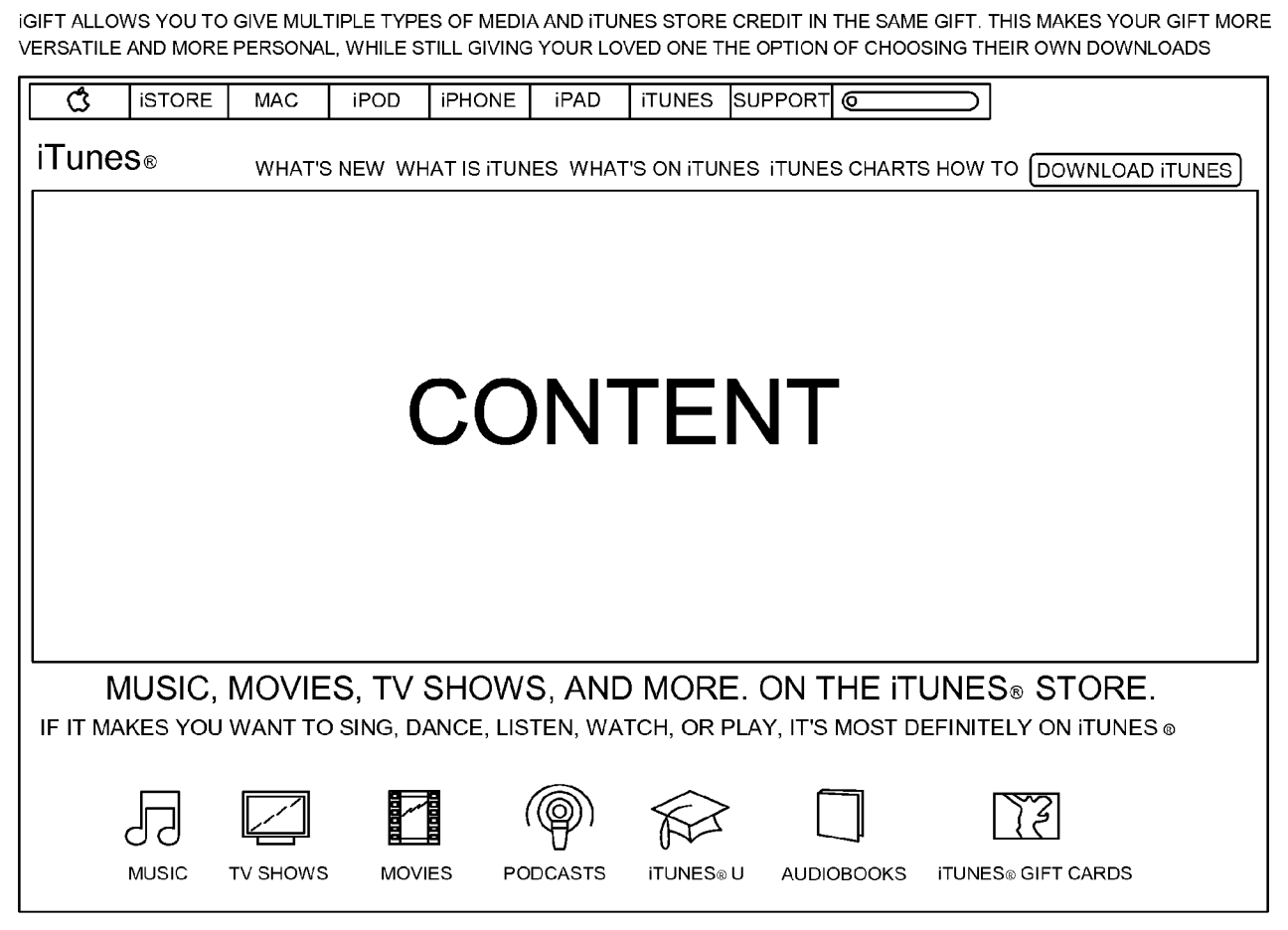

FIGS. 21-23 illustrate use of the recording technology described previously herein, but in combination with a programmable gift card envelope. In this example, an iTunes gift card envelope 2100 is illustrated. A recordable message can be created and included with such gift card envelope in a manner described in association with Embodiment 1 above so that the recorded message is played when the gift card envelope 2100 is opened or when an enclosed gift card is removed therefrom or by pressing a play button included (but not shown) on the gift card envelope. Additionally, unlike a conventional gift card envelope, the improved gift card envelope 2100 shown here is thicker than a conventional gift card envelope and includes a data port 2110, in this case an Apple® proprietary data port that is configured to interface with a computer running iTunes®, which enables the purchaser of the iTunes® gift card envelope to upload specific songs, podcasts, audiobooks, applications, or other multimedia downloadable and accessible through an iTunes-type account. It is also possible for money to be added to the value of the enclosed gift card. Preferably, the data port 2110 is connected with a memory storage device, an integrated circuit (IC), or similar data storage component installed and included with the gift card envelope 2100. Preferably, an ID code is the only actual data or information that needs to be transferred and stored within the memory of the gift card envelope 2100. Thus, when the gift card recipient connects the gift card envelope 2100 to his own computer, iTunes automatically launches, the ID code is retrieved from the memory, and any data or money transferred by the gift giver to the gift recipient is added to the recipient's library or account or is made available for download to the gift recipient's account or other multimedia device upon request. Using iPhoto®, it is also possible for the user to further personalize the gift card envelope 2100 by designing and including the user's personalized skins for use on the outside of the envelope. Plus, allowing users electronically to transfer and gift songs, albums, movies, audiobooks, podcasts, and any other type of data that can be purchased or downloaded from the iTunes® Store or directly from the iTunes® application provides a "green" solution that reduces the waste in packaging and product materials that typically accompanies a traditional gift that is given on a CD, DVD, paper- or hard-bound book, and similar product formats. Plus, it now becomes possible to gift a plurality of multimedia data types, and even transfer a cash gift, to a recipient of the iGift.

Although the above gift card envelope 2100 is illustrated specifically for use with an iTunes® data port 2110, it will be understood by those skilled in the art that any other type of data port (such as a mini-USB or standard USB port) can be used to enable a user to access a website associated with and automatically connected to, based on software pre-installed within the memory stored within the gift card envelope, which enables any retailer to enable a user to connect a gift card envelope to a computer using a USB or mini-USB port and add money and other multimedia or data onto a gift card stored therein or to an account established by the recipient of the gift with the relevant retailer.

Figure 24:
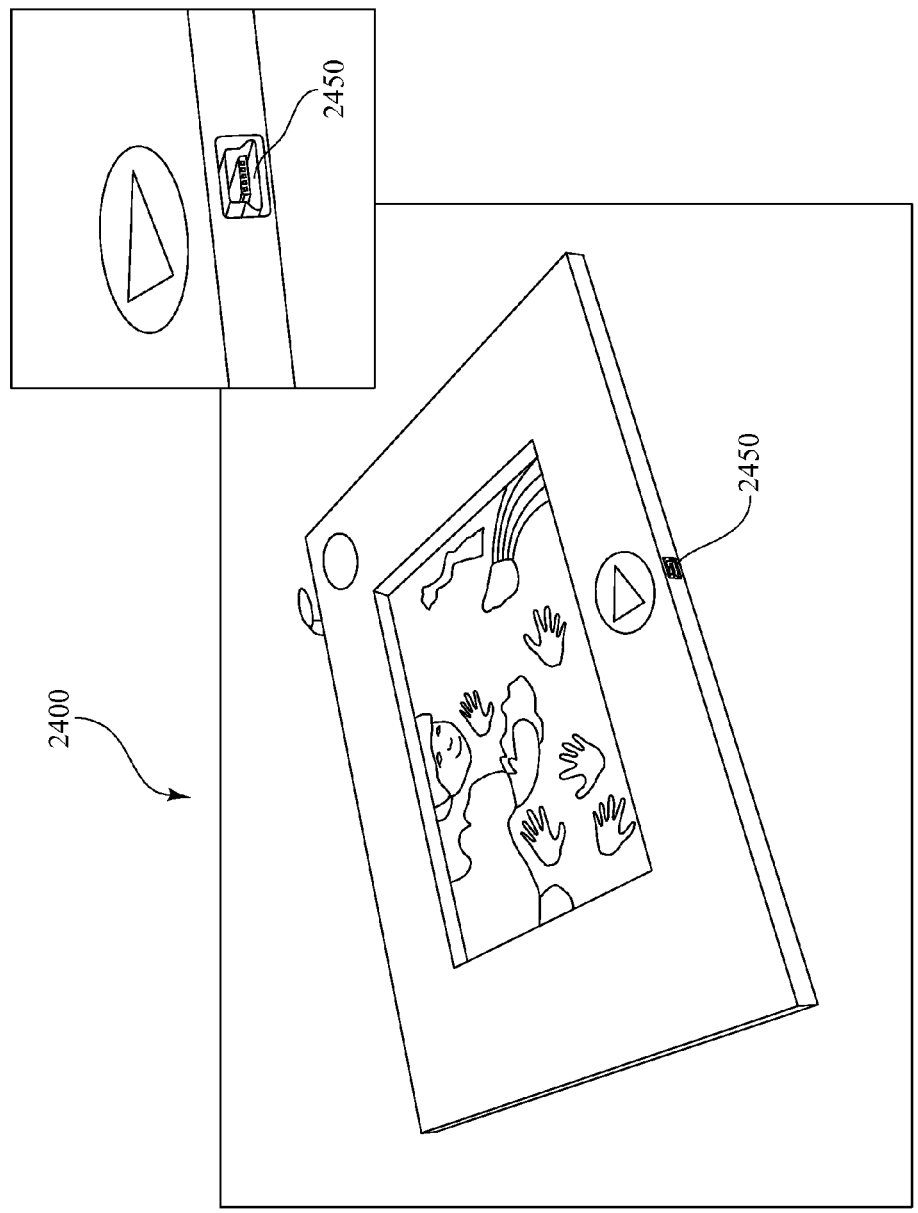

FIG. 24 illustrates a picture frame 2400 having audio recording capabilities, as described in Embodiment 1, in combination with a data port 2450 to enable the uploading and storage of data as described in connection with Embodiment 2.

Figure 25:
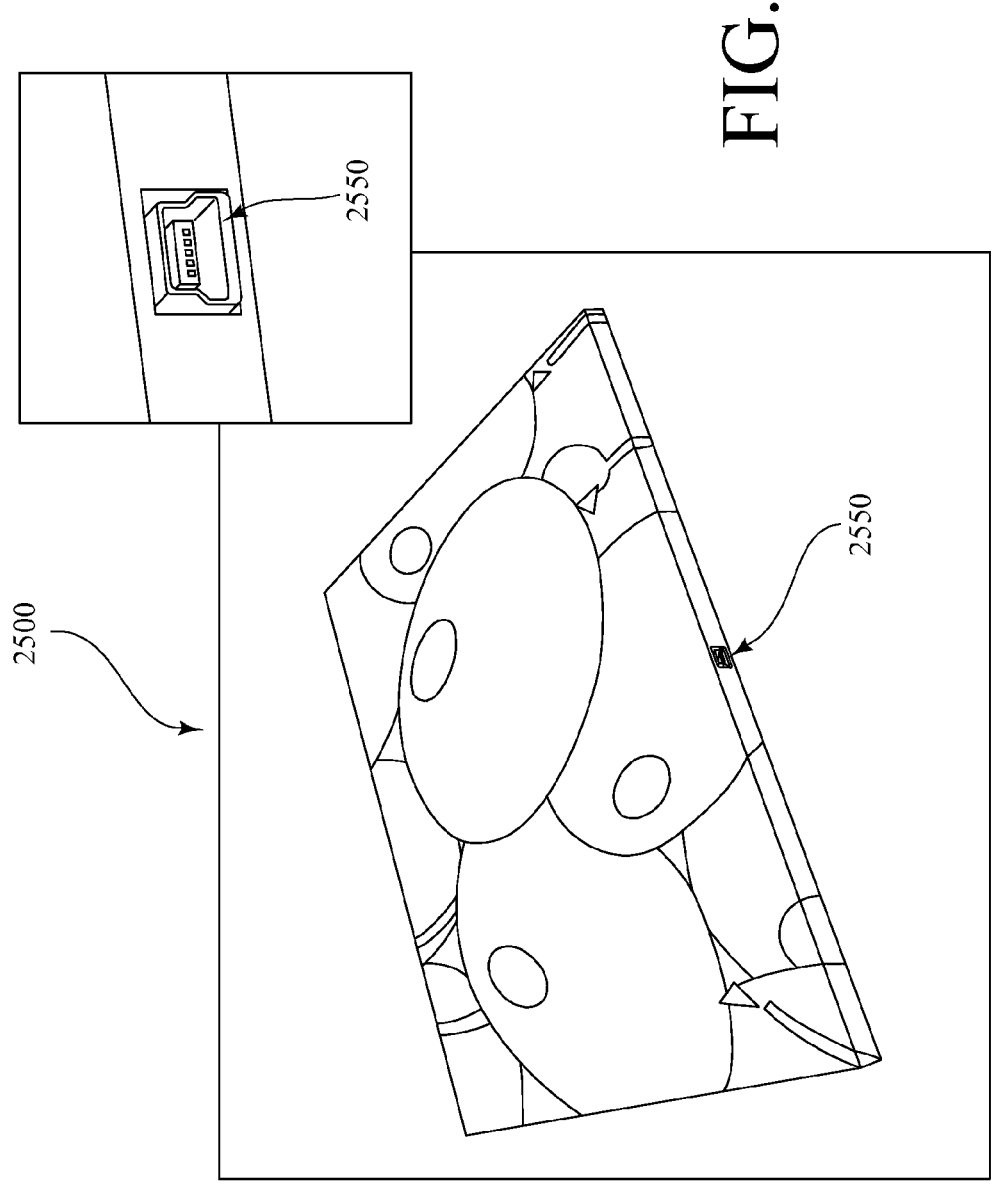
Figure 27:
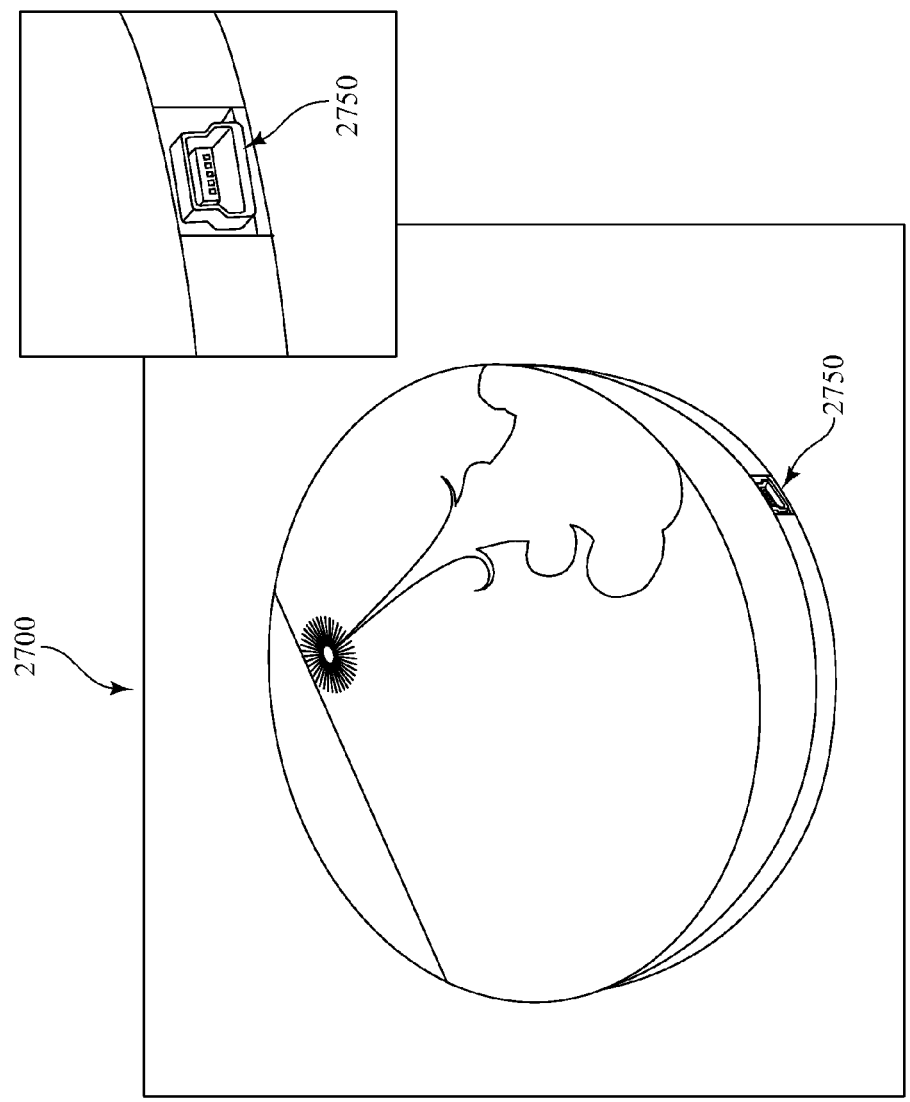
Figure 28:
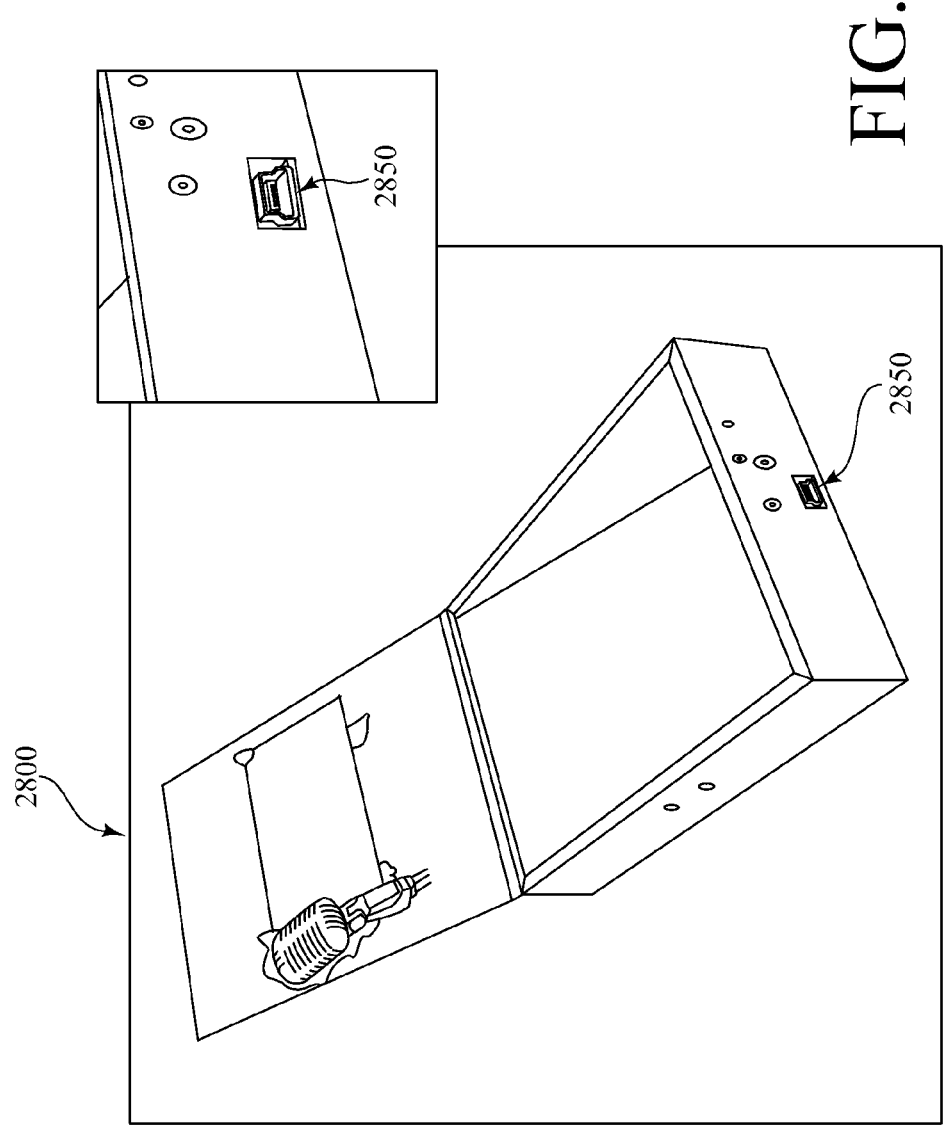
Figure 29:
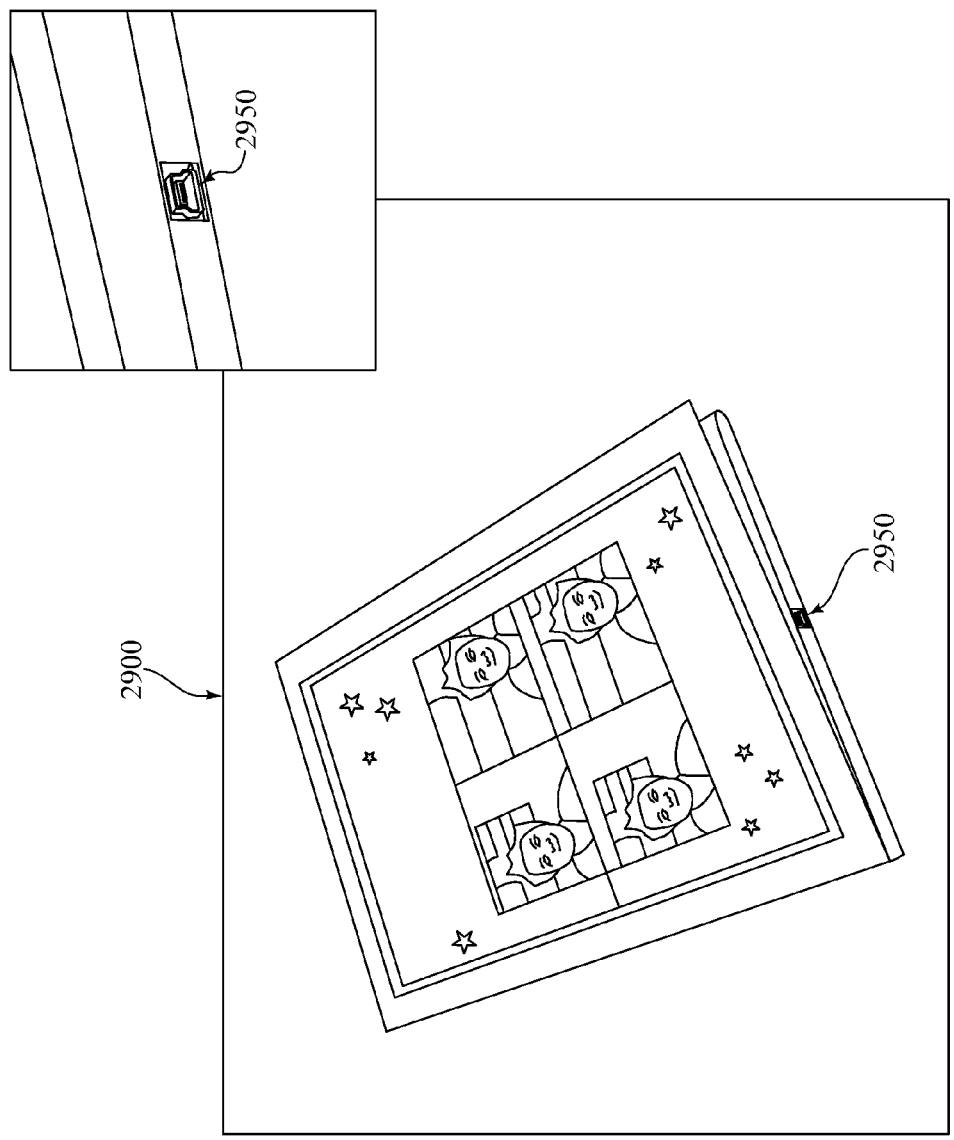
Figure 30:
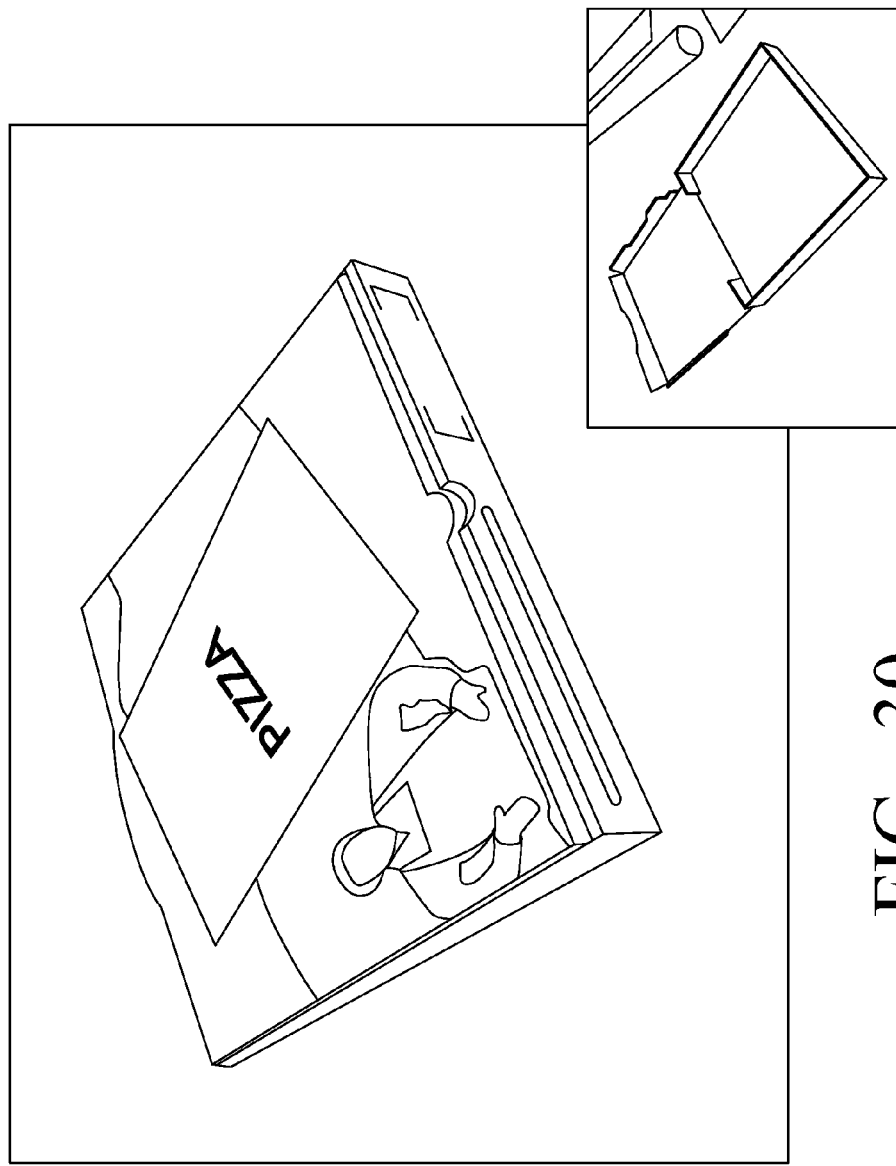
Figure 31:
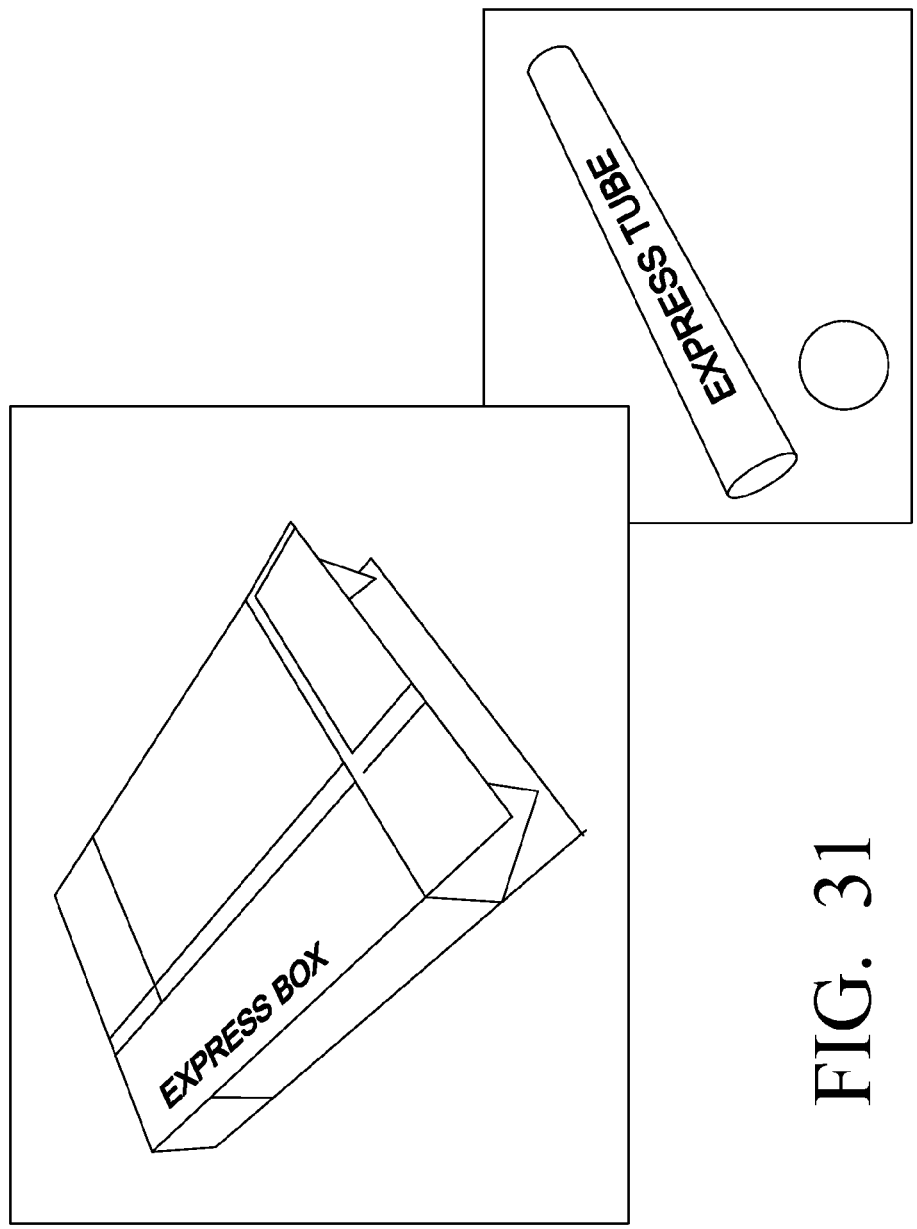

FIG. 25 illustrates an extra large "talking" envelope 2500 having audio recording capabilities, as described in Embodiment 1, in combination with a data port 2550, which enables the gift giver to upload and store data for the gift recipient as described in connection with Embodiment 2.

FIG. 26 illustrates another exemplary photobook insert 2600 that has audio recording capabilities, as described in Embodiment 1, and, as shown in this example, can be specifically tailored and targeted to parents of infants so that first giggles and/or first words uttered by the infant can be captured and recorded on a card having a happy tab 2680 that can be removed to prevent the accidental deletion of such important and memorable first words or sounds. Similar type of photobook inserts can be custom tailored and targeted for use and sale for special occasions, such as wedding, birthdays, parties, or sold in gift shops at vacation destinations or honeymoon locations so that a personalized and permanent audio recording can be added to a postcard and later inserted into a photo album, baby book, or the like for later viewing and listening—years after the event or trip.

FIGS. 27-31 illustrate additional products that can be adapted to have audio recording capabilities, as described in Embodiment 1, and/or a data port for uploading of multimedia files or data for storage purposes. Such products include ornaments, CD-music cases, product boxes or packaging, gift card holder boxes, pizza or other food containers, or mailing type containers. The audio recording can be used by the seller of the product to provide additional information about the product, to offer special redemption prizes or codes or coupons and how to obtain them, to advertise another product, or just to issue a "personal" thank you for purchasing the product. The audio playback can be triggered by a pull-tab actuator, using a play button, or by other types of known switches, such as sound, air, or light-triggered actuators.

While the systems, methods, technologies, devices, circuits, components, and end products have been described and illustrated in connection with preferred embodiments, many variations and modifications and additional aspects, features, and methodologies of the disclosure will be readily discernable therefrom and will be evident to those skilled in the art and may be made without departing from the spirit and scope of the disclosure. Further, many additional embodiments and adaptations of the disclosure, other than those specifically described herein, as well as many variations, modifications, and equivalent arrangements and methodologies, will be apparent from or reasonably suggested by the disclosure, without departing from the substance or scope of the disclosure.

Furthermore, any sequence(s) and/or temporal order of steps of various processes described and claimed herein are those considered to be the best mode contemplated for carrying out the systems and methods disclosed herein. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the disclosure. In addition, some steps may be carried out simultaneously.

Accordingly, while the systems and methods have been described herein in detail in relation to preferred embodiments, it is to be understood that this disclosure is only illustrative and exemplary of the systems and methods and is made merely for purposes of providing a full and enabling disclosure of the invention. The disclosure is thus not to be limited to the precise details of methodology or construction set forth above as such variations and modification are intended to be included within the scope of the disclosure.

What is claimed is:

1. A gift card envelope for holding a gift card, comprising:
 a body having a foldably movable portion and adapted to receive the gift card therein, the body including at least a front surface containing brand information identifying a company associated with the enclosed gift card, a back surface in planar, parallel arrangement to the front surface and connected along at least a portion of the adjoining edges of the front surface, and a bottom surface connected between the front and back surfaces, whereby the bottom edge creates a space between the parallel front and back surfaces;
 a data port mourned between the front and back surfaces and accessible from the exterior side of the bottom surface, the data port adapted for electronic connection with an external computing device for receiving data uploaded therefrom and for downloading data thereto; and
 a data storage component housed within the gift card envelope and in electronic communication with the data port for receiving and storing the received data and for storing communication data downloadable from the gift card envelope when the data port is connected with the external computing device, wherein the gift card envelope connects with a website associated with the company associated with the gift card as a function of the communication data when the data port is connected with the external computing device;

wherein, after the gift card envelope connects with the website associated with the company associated with the gift card, monetary credit is added to the gift card by a user of the external computing device through interaction with the website, and wherein the user adds monetary credit to the gift card by paying the company via the website, wherein an ID code is uploaded and stored within the data storage component, and wherein the ID code identifies the monetary credit that is credited to a recipient of the gift card when the recipient subsequently connects the data port with another external computing device and accesses the company's website.

2. The gift card envelope of claim 1, wherein, after the gift card envelope connects with the website associated with the company associated with the gift card, one or more multimedia files are uploaded to the data storage component housed within the gift card envelope by a user of the external computing device through interaction with the website.

3. The gift card envelope of claim 2, wherein the multimedia files are already owned by the user and are uploaded for no cost from an account the user has with the website.

4. The gift card of claim 2, wherein the multimedia files are purchased by the user on the website before they are uploaded to the data storage component housed within the gift card envelope.

* * * * *